United States Patent
Inui et al.

(10) Patent No.: US 10,703,167 B2
(45) Date of Patent: Jul. 7, 2020

(54) AIR-CONDITIONING CONTROL SYSTEM AND INFORMATION PROCESSING DEVICE

(71) Applicant: Toyota Jidosha Kabushiki Kaisha, Toyota-shi, Aichi-ken (JP)

(72) Inventors: Maya Inui, Toyota (JP); Kunihiko Jinno, Toyota (JP); Kan Saitou, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 321 days.

(21) Appl. No.: 15/625,279

(22) Filed: Jun. 16, 2017

(65) Prior Publication Data
US 2017/0368906 A1    Dec. 28, 2017

(30) Foreign Application Priority Data
Jun. 24, 2016 (JP) .................................. 2016-126023

(51) Int. Cl.
*B60H 1/00* (2006.01)
*G01W 1/02* (2006.01)

(52) U.S. Cl.
CPC ..... *B60H 1/00735* (2013.01); *B60H 1/00742* (2013.01); *B60H 1/00771* (2013.01); *B60H 1/00785* (2013.01); *G01W 1/02* (2013.01)

(58) Field of Classification Search
CPC ............ B60H 1/00735; B60H 1/00742; B60H 1/00771; B60H 1/00785; B60H 1/00849; B60H 1/00642; B60H 1/3207; G01W 1/02

(Continued)

(56) References Cited

U.S. PATENT DOCUMENTS 8,209,073 B2* 6/2012 Wijaya ................. B60H 1/3205
                                                                    165/42
9,696,055 B1* 7/2017 Goodman .......... G05D 23/1932
(Continued)

FOREIGN PATENT DOCUMENTS

JP   2002-013779 A   1/2002
JP   2003-025825 A   1/2003
(Continued)

OTHER PUBLICATIONS

U.S. Appl. No. 15/637,387, filed Jun. 29, 2017, Inventors: Maya Inui et al.

*Primary Examiner* — Richard A Goldman
(74) *Attorney, Agent, or Firm* — Dinsmore & Shohl LLP

(57) ABSTRACT

An air-conditioning control system includes: an air-conditioning device; and a control device configured to: acquire weather information; detect a boarding event; determine whether an amount of moisture brought in due to an external environment of a vehicle, which is an amount of moisture brought into the vehicle by the occupant at the time of the boarding event, is greater than a predetermined level on the basis of the weather information when a boarding event is detected by the boarding event detecting unit; and change the control information to a second state when it is determined that the amount of moisture brought in while the control information indicates a first state is greater than the predetermined level; control the air-conditioning device; and set a ventilation capacity of the air-conditioning device to be higher when the control information indicates the second state than when the control information indicates the first state.

14 Claims, 13 Drawing Sheets

(58) Field of Classification Search
USPC .............. 701/36, 408, 53; 700/276; 454/75; 165/42, 222
See application file for complete search history.

(56) References Cited

U.S. PATENT DOCUMENTS

| | | | | |
|---|---|---|---|---|
| 9,802,463 | B2* | 10/2017 | Maeda | B60H 1/0005 |
| 10,239,543 | B2* | 3/2019 | Frank | B60H 1/00864 |
| 10,386,088 | B2* | 8/2019 | Castillo | H04L 12/2825 |
| 10,417,387 | B2* | 9/2019 | Toupin | G16H 20/10 |
| 2001/0010261 | A1* | 8/2001 | Oomura | B60H 1/3208 |
| | | | | 165/42 |
| 2005/0066669 | A1* | 3/2005 | Sugesawa | B60H 1/3205 |
| | | | | 62/133 |
| 2008/0188271 | A1* | 8/2008 | Miyauchi | G10L 21/0208 |
| | | | | 455/569.2 |
| 2009/0150024 | A1* | 6/2009 | Kojima | B60H 1/00642 |
| | | | | 701/36 |
| 2011/0071722 | A1* | 3/2011 | Uto | B60H 1/00978 |
| | | | | 701/29.5 |
| 2011/0307148 | A1* | 12/2011 | Griffin | B60N 2/002 |
| | | | | 701/45 |
| 2012/0310477 | A1* | 12/2012 | Wippler | B60K 35/00 |
| | | | | 701/36 |
| 2013/0052929 | A1* | 2/2013 | Eisenhour | B60H 1/00742 |
| | | | | 454/75 |
| 2014/0080398 | A1* | 3/2014 | Tabei | B60H 1/00785 |
| | | | | 454/75 |
| 2017/0096048 | A1* | 4/2017 | Larson | B60H 1/3207 |
| 2017/0361680 | A1* | 12/2017 | Uehara | B60H 1/323 |
| 2017/0368906 | A1* | 12/2017 | Inui | B60H 1/00735 |
| 2018/0009290 | A1* | 1/2018 | Inui | B60H 1/00785 |
| 2018/0036448 | A1* | 2/2018 | Becker | A61L 9/032 |
| 2018/0320609 | A1* | 11/2018 | McQuillen | F01N 13/008 |
| 2019/0056741 | A1* | 2/2019 | Zych | G08G 1/165 |
| 2019/0124423 | A1* | 4/2019 | Stamatakis | H04L 12/40 |
| 2019/0337358 | A1* | 11/2019 | Wamsley | G08G 1/0967 |

FOREIGN PATENT DOCUMENTS

| | | |
|---|---|---|
| JP | 2006-248306 A | 9/2006 |
| JP | 2008-137599 A | 6/2008 |
| JP | 2011-068157 A | 4/2011 |
| JP | 2012-215345 A | 11/2012 |
| JP | 2014-020650 A | 2/2014 |
| JP | 2015-054688 A | 3/2015 |
| WO | 2015/036833 A1 | 3/2015 |

* cited by examiner

FIG. 9A

| NUMBER OF OCCUPANTS | ABSOLUTE HUMIDITY [g/kg] |
|---|---|
| ONE | 0.4 |
| TWO | 0.8 |
| THREE OR MORE | 1.6 |

FIG. 9B

| NUMBER OF UMBRELLAS | ABSOLUTE HUMIDITY [g/kg] |
|---|---|
| ONE | 0.3 |
| TWO | 0.6 |
| THREE OR MORE | 1.2 |

FIG. 11A

TRAVEL INFORMATION ID = j

| TERMINAL ID | TRAVEL DATE AND TIME | LINK ID |
|---|---|---|
| 00001 | ** | ** |
| 00001 | ** | ** |
| ⋮ | ⋮ | ⋮ |
| 00001 | ** | ** |

FIG. 11B

| TERMINAL ID | TRAVEL INFORMATION ID | START ON/OFF DATE AND TIME | VEHICLE POSITION (LATITUDE, LONGITUDE) |
|---|---|---|---|
| 00001 | ** | ** | ** |
| 00001 | ** | ** | ** |
| ⋮ | ⋮ | ⋮ | ⋮ |
| 00002 | ** | ** | ** |

AIR-CONDITIONING CONTROL SYSTEM AND INFORMATION PROCESSING DEVICE

CROSS-REFERENCE TO RELATED APPLICATION

This application claims priority to Japanese Patent Application No. 2016-126023 filed on Jun. 24, 2016 which is incorporated herein by reference in its entirety including the specification, drawings and abstract.

BACKGROUND

1. Technical Field

The disclosure relates to an air-conditioning control system and an information processing device.

2. Description of Related Art

A technique of individually calculating both an increase in absolute humidity and a decrease in absolute humidity in a vehicle interior during travel of a vehicle, calculating current absolute humidity in the vehicle interior on the basis of the calculated increase and decrease, and controlling an air-conditioning device on the basis of the calculated current absolute humidity is known (for example, see Japanese Patent Application Publication No. 2015-54688 (JP 2015-54688 A)).

SUMMARY

However, in such a related art, when a boarding event in which an occupant boards a vehicle occurs, it is difficult to enhance a ventilation capacity of the air-conditioning device depending on an amount of moisture brought in due to an external environment of the vehicle (hereinafter also simply referred to as an "amount of moisture brought in"), which is an amount of moisture brought into the vehicle by the occupant at the time of the boarding event. The amount of moisture brought in may significantly increase depending on the weather at a boarding position. For example, when the weather at the boarding position is rain or snow, there is a high possibility that the occupant or the occupant's belongings (such as an umbrella) will get wet before she or he boards the vehicle and thus there is a high possibility of the amount of moisture brought in being greater than that, for example, when the weather at the boarding position is fair.

Therefore, an object of the disclosure is to enable enhancement in ventilation capacity of an air-conditioning device depending on an amount of moisture brought in by an occupant in a boarding event.

A first aspect of the disclosure relates to an air-conditioning control system. The air-conditioning control system includes: an air-conditioning device; a control device including a memory configured to store control information on control of the air-conditioning device, the control device being configured to: acquire weather information at a position of a vehicle; detect a boarding event in which an occupant boards the vehicle; determine whether an amount of moisture brought in due to an external environment of the vehicle, which is an amount of moisture brought into the vehicle by the occupant at the time of the boarding event, is greater than a predetermined level on the basis of the weather information when the boarding event is detected; change the control information on the basis of the determination result; and control the air-conditioning device according to the control information, wherein the control device changes the control information to a second state when it is determined that the amount of moisture brought in while the control information indicates a first state is greater than the predetermined level, and controls the air-conditioning device such that a ventilation capacity of the air-conditioning device to be higher when the control information indicates the second state than when the control information indicates the first state.

A second aspect of the disclosure relates to an air-conditioning control system. The air-conditioning control system includes: an air-conditioning device provided on a vehicle; a control device provided on the vehicle, a control device being configured to control the air-conditioning device; a communication unit connected to the control device; and an information processing device configured to perform bidirectional communication with the communication unit, the information processing device being disposed remotely from a vehicle, the information processing device including a memory configured to store control information on control of the air-conditioning device, the information processing device being configured to: acquire weather information at a position of the vehicle, detect a boarding event in which an occupant boards the vehicle, determine whether an amount of moisture brought in due to an external environment of the vehicle, which is an amount of moisture brought into the vehicle by the occupant at the time of the boarding event, is greater than a predetermined level on the basis of the weather information when the boarding event is detected, and change the control information on the basis of the determination result, wherein the information processing device changes the control information to a second state when the information processing device determines that the amount of moisture brought in while the control information indicates a first state is greater than the predetermined level, and the information processing device transmits a first predetermined signal to the communication unit when the control information indicates the first state and transmits a second predetermined signal to the communication unit when the control information indicates the second state, and the control device sets a ventilation capacity of the air-conditioning device to be higher when the communication unit receives the second predetermined signal than when the communication unit receives the first predetermined signal.

A third aspect of the disclosure relates to an information processing device disposed remotely from a vehicle. The information processing device includes a memory configured to store control information on control of an air-conditioning device which is disposed in the vehicle; a control device configured to: acquire weather information at a position of a vehicle; detect a boarding event in which an occupant boards the vehicle; determine whether an amount of moisture brought in due to an external environment of the vehicle, which is an amount of moisture brought into the vehicle by the occupant at the time of the boarding event, is greater than a predetermined level on the basis of the weather information when the boarding event is detected by the boarding event detecting unit; and change the control information on the basis of the determination result; and a communication unit configured to perform bidirectional communication with the vehicle, wherein the control device changes the control information to a second state when is the control device determines that the amount of moisture brought in while the control information indicates a first state is greater than the predetermined level, and the communication unit transmits a first predetermined signal to the vehicle when the control information indicates the second state, the predetermined signal serving as a command for causing a controller of the air-conditioning device to set a ventilation capacity of the air-conditioning device to be higher than when the control information indicates the first state.

According to the air-conditioning control system and the information processing device described above, when a boarding event in which an occupant boards the vehicle occurs, it is determined whether the amount of moisture brought in is greater than a predetermined level on the basis of the weather information. When it is determined that the amount of moisture brought in while the control information on the control of the air-conditioning device indicates the first state is greater than the predetermined level, the control information is changed to the second state. Accordingly, it possible to set the ventilation capacity of the air-conditioning device to be higher than when the control information indicates the first state. Accordingly, it is possible to enhance the ventilation capacity of the air-conditioning device depending on the amount of moisture brought in.

According to above aspects of the disclosure, the determination unit may update an integrated value of a time in which weather at a current position of the vehicle, which is weather indicated by the weather information, is neither rain nor snow after the control information is changed to the second state, and may return the control information to the first state on the basis of the updated integrated value. Here, when there is neither rain nor snow, discharge of moisture from the vehicle by ventilation is promoted and thus the integrated value can be used to estimate a timing at which the amount of moisture brought in is discharged to the outside by the ventilation. According to this, it is possible to achieve a decrease in ventilation loss by returning the control information to the first state on the basis of the integrated value. According to above aspects of the disclosure, the determination unit may update an integrated value of an amount of moisture discharged from the vehicle by ventilation on the basis of temperature information and humidity information outside the vehicle and temperature information inside vehicle after the control information is changed to the second state, and may return the control information to the first state on the basis of the updated integrated value. Here, the amount of moisture discharged from the vehicle by the ventilation depends on the temperature or humidity inside and outside the vehicle. According to this, it is possible to achieve a decrease in ventilation loss by updating the integrated value of the amount of moisture discharged from the vehicle by the ventilation on the basis of the temperature information outside the vehicle or the like and returning the control information to the first state on the basis of the updated integrated value. According to above aspects of the disclosure, the determination unit may additionally change the duration in which the control information indicates the second state on the basis of the number of occupants. Here, a larger number of occupants indicates a higher possibility that the amount of moisture brought in will be large. According to this, it is possible to achieve adjustment of the duration by changing the duration in which the control information indicates the second state on the basis of the number of occupants.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 9A is a diagram illustrating an index value calculation map;

FIG. 9B is a diagram illustrating an index value calculation map;

FIG. 11A is a diagram illustrating data in a travel history database;

FIG. 11B is a diagram illustrating data in the travel history database;

DETAILED DESCRIPTION OF EMBODIMENTS

Hereinafter, embodiments of the disclosure will be described in detail with reference to the accompanying drawings.

First Embodiment

Figure 1:
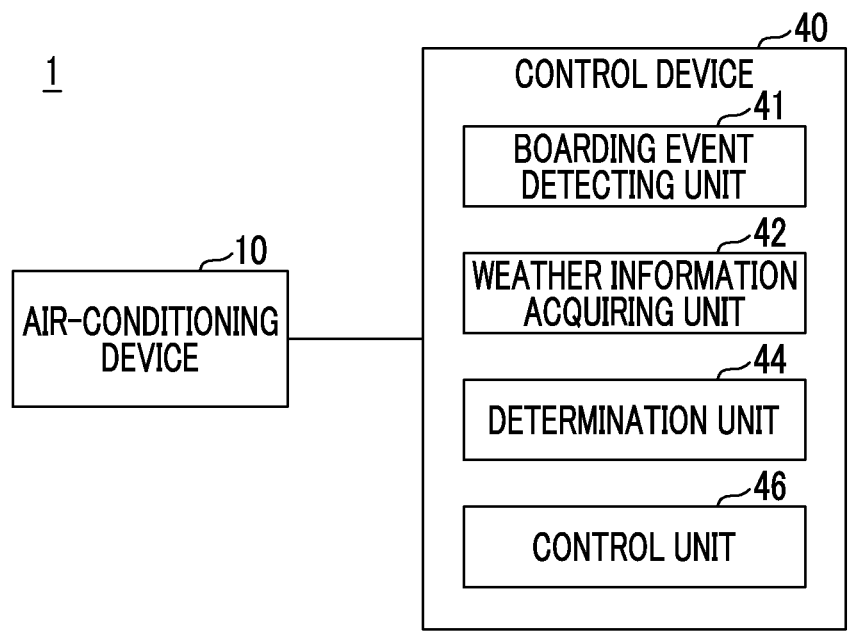
FIG. 1 is a diagram illustrating a basic configuration of an air-conditioning control system according to a first embodiment.

FIG. 1 is a diagram illustrating a basic configuration of an air-conditioning control system 1 according to a first embodiment.

The air-conditioning control system 1 is mounted in a vehicle. Hereinafter, the vehicle in which the air-conditioning control system 1 is mounted is also referred to simply as "the vehicle." The air-conditioning control system 1 includes an air-conditioning device 10 and a control device 40.

The air-conditioning device 10 has a variable ventilation capacity. The ventilation capacity can be changed by changing an opening level of an outside/inside air door (for example, an outside/inside air door 119 illustrated in FIG. 3). The ventilation capacity can be changed by changing a rotation speed of a blower motor (for example, a blower motor 122 illustrated in FIG. 3) when an outside air introduction rate is greater than 0%.

Figure 2:
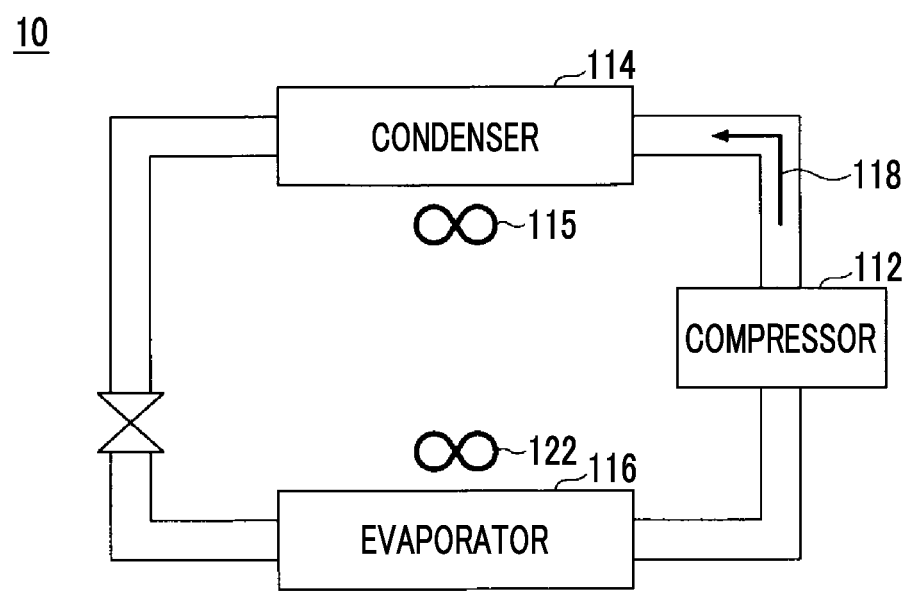
FIG. 2 is a diagram illustrating an example of an air-conditioning device.
Figure 3:
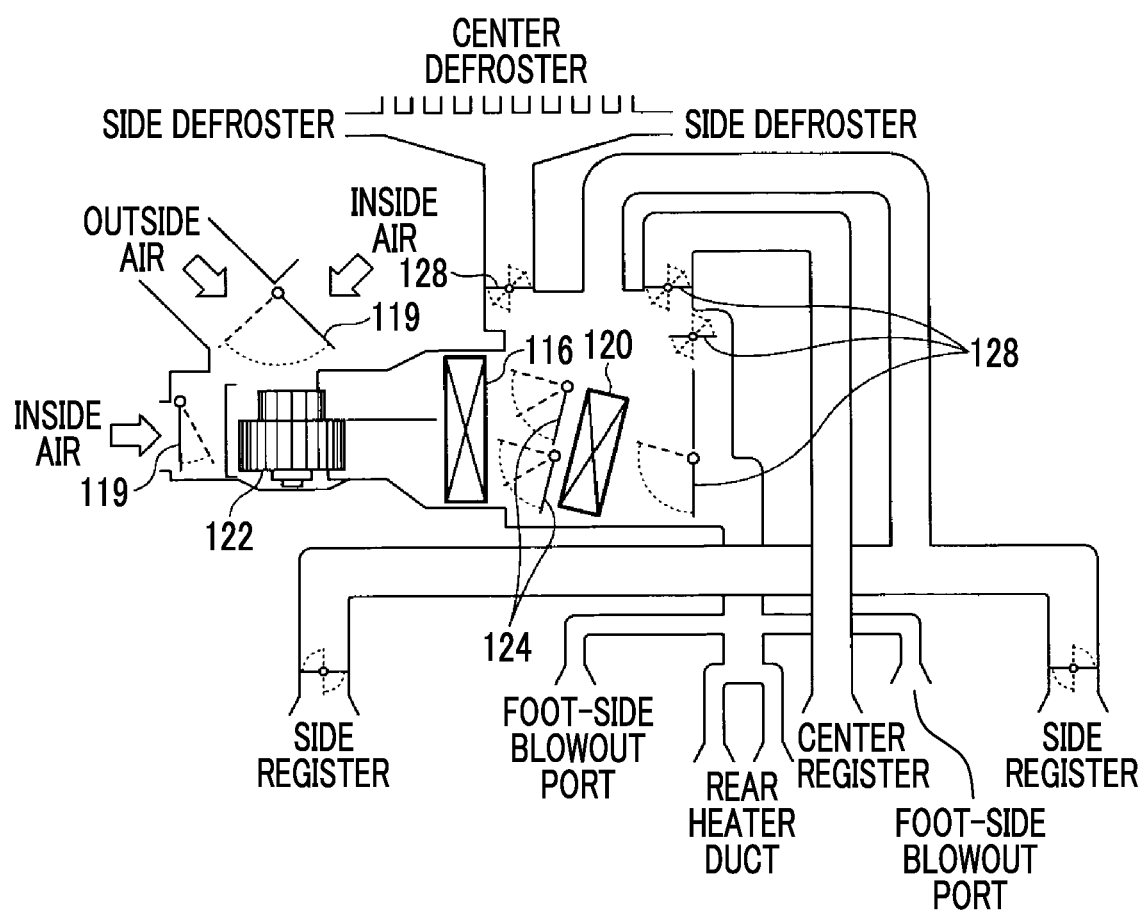
FIG. 3 is a diagram illustrating an example of the air-conditioning device.

FIGS. 2 and 3 are diagrams illustrating an example of the air-conditioning device 10. In the example illustrated in FIGS. 2 and 3, the air-conditioning device 10 includes a compressor 112 that compresses a refrigerant. The refrigerant compressed by the compressor 112 circulates in a refrigerant passage 118 including a condenser 114 and an evaporator 116. The condenser 114 performs a function of cooling a vaporized refrigerant and changing the vaporized refrigerant to a liquid refrigerant to be supplied to the evaporator 116. A suction type electric fan 115 that cools the condenser 114 is disposed upstream from the condenser 114. The evaporator 116 is disposed in a vehicle interior. As illustrated in FIGS. 2 and 3, a blower motor (a blower fan) 122 of which a rotation speed can be adjusted is disposed upstream from the evaporator 116. The blower motor 122 communicates with the vehicle exterior or the vehicle interior via the outside/inside air door 119. The blower motor 122 has a function of sending air of the vehicle exterior or the vehicle interior (that is, outside air, inside air, or mixed air thereof) to the vehicle interior via the evaporator 116. A flow rate of air sent to the vehicle interior (that is, a blower air volume) is adjusted by controlling the rotation speed of the blower motor 122. When the blower motor 122 rotates, air flowing via the outside/inside air door 119 (that is, outside air, inside air, or mixed air thereof) passes through the evaporator 116. The evaporator 116 cools air passing through the evaporator 116 by vaporizing the refrigerant compressed by the compressor 112. A heater core 120 is disposed downstream from the evaporator 116. In the heater core 120, an air mix door 124 of which an opening level can be adjusted (for example, which is driven by a servomotor) is set. The heater core 120 performs a function (a reheating function) of mixing warm air with air (cold air) cooled by the evaporator 116 in cooperation with the air mix door 124. The temperature of air sent to the vehicle interior is adjusted by controlling the opening level of the air mix door 124 (that is, a mixture ratio of cold air and warm air). Ducts for guiding mixed air to blowout ports disposed at predetermined positions in the vehicle interior are disposed downstream from the heater core 120. Mode doors 128 for selectively guiding mixed air to a predetermined blowout port are set downstream from the heater core 120.

Figure 4:
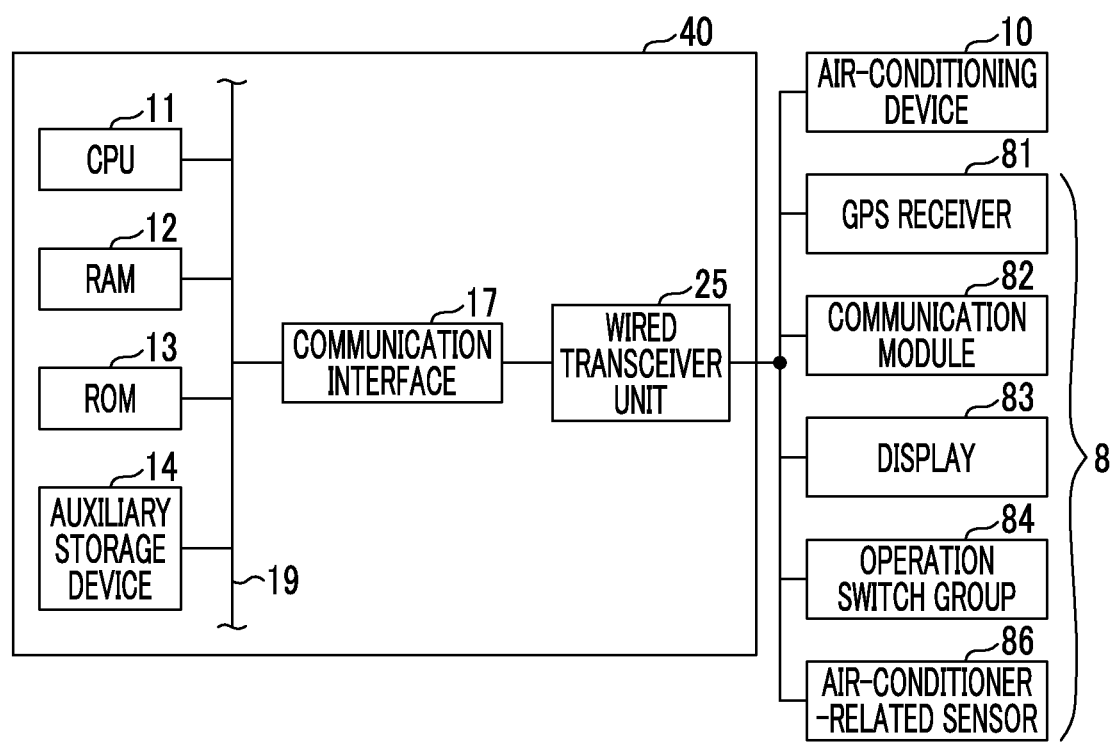
FIG. 4 is a diagram illustrating an example of a hardware configuration of a control device.

The control device 40 is constituted by a computer. For example, the control device 40 is an air-conditioner electronic control unit (ECU). FIG. 4 is a diagram illustrating an example of a hardware configuration of the control device 40. FIG. 4 schematically illustrates an example of elements included in an on-board electronic device group 8 and the air-conditioning device 10 in association with the hardware configuration of the control device 40.

The control device 40 includes a central processing unit (CPU) 11, a random access memory (RAM) 12, a read only memory (ROM) 13, an auxiliary storage device 14 (a nonvolatile memory such as an electrically erasable programmable read only memory (EEPROM)), a communication interface 17 which are connected through a bus 19, and a wired transceiver unit 25 connected to the communication interface 17.

The wired transceiver unit 25 includes a transceiver unit that can perform communication using a vehicle network such as a controller area network (CAN) or a local interconnect network (LIN). The control device 40 may include a wireless transceiver unit (not illustrated) connected to the communication interface 17 in addition to the wired transceiver unit 25. In this case, the wireless transceiver unit may include a near field communication (NFC) unit, a Bluetooth (registered trademark) communication unit, a wireless-fidelity (Wi-Fi) transceiver unit, or an infrared transceiver unit.

The on-board electronic device group 8 includes a Global Positioning System (GPS) receiver 81, a communication module 82, a display 83, an operation switch group 84, and an air-conditioner-related sensor 86.

The GPS receiver 81 measures a vehicle position on the basis of radio waves from GPS satellites. The communication module 82 is a transceiver unit that can perform radio communication, for example, a radio communication network in a mobile phone. The communication module 82 is fixed in the vehicle. In a modified example, the communication module 82 may be embodied by a mobile terminal (such as a smartphone or a tablet) that can be brought into the vehicle. In this case, the control device 40 can communicate with the outside using the communication module 82 via the wireless transceiver unit (for example, the Bluetooth communication unit).

The display 83 is, for example, a touch panel type liquid crystal display. The display 83 is disposed at a position at which it is visible to a driver. The display 83 is a display which is fixed in the vehicle, but may be a display of a mobile terminal that can be brought into the vehicle. In this case, communication between the mobile terminal and the control device 40 can be embodied via the wireless transceiver unit (for example, the Bluetooth communication unit).

The operation switch group 84 is disposed in a control panel (not illustrated) which is used by a user to operate the air-conditioning device 10. The control panel is disposed, for example, in an instrument panel. The operation switch group 84 includes an A/C switch for turning operation of the compressor 112 on and off, a switch for switching an operation mode (an automatic mode or a manual mode) of the air-conditioning device 10, a switch for switching a suction port mode (an inside air circulation mode or an outside air introduction mode), a switch (a blower dial) for adjusting a blower air volume, a defroster switch for switching a foot defroster mode or a defroster mode on and off, and a switch (a temperature setting dial) for setting a temperature. A part or all of the operation switch group 84 may be set in a mobile terminal that can be brought into the vehicle.

The air-conditioner-related sensor 86 includes an inside air temperature sensor that detects a temperature of the vehicle interior and an outside air temperature sensor that detects a temperature of the vehicle exterior. In addition, the air-conditioner-related sensor 86 may include a solar radiation sensor that detects an amount of solar radiation and a temperature sensor that detects a temperature of cold air immediately after passing through the evaporator 116.

As illustrated in FIG. 1, the control device 40 includes a boarding event detecting unit 41, a weather information acquiring unit 42, a determination unit 44, and a control unit 46. The boarding event detecting unit 41, the weather information acquiring unit 42, the determination unit 44, and the control unit 46 can be embodied by causing the CPU 11 illustrated in FIG. 4 to execute one or more programs stored in the ROM 13.

The boarding event detecting unit 41 detects a boarding event in which an occupant boards the vehicle. For example, the boarding event detecting unit 41 detects occurrence of a start event of the vehicle as a boarding event. The start event of the vehicle is an event of turning on a start switch (for example, an ignition switch or a power supply switch in the case of an electric vehicle). Alternatively, the boarding event detecting unit 41 may detect a boarding event when a door is opened and closed within a predetermined time after the door is opened and closed again in a state in which the vehicle is stopped during operation of the vehicle (that is, while the start switch is turned on). Alternatively, the boarding event detecting unit 41 may detect a boarding event when the start event of the vehicle occurs after a door is opened and closed. Alternatively, the boarding event detecting unit 41 may detect a boarding event when a door lock is unlocked from a locked state, then a door is opened and closed, and then the start event of the vehicle occurs. In the above description, "opening and closing of a door" means a combination of an opening operation and a closing operation thereafter and can be detected using a door switch (not illustrated).

The weather information acquiring unit 42 acquires weather information indicating the weather at a current position of the vehicle. The weather information acquired by the weather information acquiring unit 42 includes information indicating the weather such as rain, fair weather, or snow and also appropriately includes information such as a temperature, an amount of precipitation, and humidity. For example, when a boarding event is detected by the boarding event detecting unit 41, the weather information acquiring unit 42 acquires the weather information at the current position of the vehicle. The weather information acquiring unit 42 acquires the weather information at the current position of the vehicle via the communication module 82. In the following description, the "current position of the vehicle" when a boarding event is detected is also referred to as a "boarding position."

For example, when there is weather information for each local area, the weather information at the boarding position is weather information associated with a local area in which the boarding position is located. The weather information can be acquired, for example, from a server (not illustrated) that provides weather data. Such a server is a server that derives and provides weather information having a high real-time property on the basis of first-hand information transmitted from a plurality of users throughout the country, observed data from observation devices disposed in local areas throughout the country, or prediction based on movement of clouds by a radar. The boarding position can be determined on the basis of the vehicle position (the vehicle position from the GPS receiver 81) when the start switch is turned on.

The determination unit 44 determines whether an amount of moisture brought in due to an external environment of the vehicle (hereinafter also simply referred to as an "amount of moisture brought in"), which is an amount of moisture brought into the vehicle by an occupant at the time of the boarding event, is greater than a predetermined level on the basis of the weather information acquired by the weather information acquiring unit 42. The amount of moisture brought in is an amount of moisture brought in (hereinafter also simply referred to as "brought-in moisture") due to the external environment of the vehicle as moisture brought into the vehicle by an occupant at the time of the boarding event. The moisture brought in due to the external environment of the vehicle is moisture attached to an occupant's body, the occupant's belongings, or the like due to the external environment such as moisture attached to an umbrella, a bag, or the like during rain. Accordingly, the brought-in moisture which is defined herein does not include moisture included in an occupant's body, moisture of a beverage in a plastic bottle, and the like. The predetermined level can conceptually correspond to an amount of moisture brought in at which it is necessary to enhance the ventilation capacity and can depend on a volume of the vehicle interior of the vehicle. Determination of whether the amount of moisture brought in is greater than the predetermined level when the predetermined level is 0 is the same as determination of whether there is brought-in moisture. Accordingly, determination of whether the amount of moisture brought in exceeds the predetermined level is a concept including determination of whether there is brought-in moisture. The method of determining whether the amount of moisture brought in is greater than the predetermined level is, for example, as follows.

In a first example, the determination unit 44 determines that the amount of moisture brought in is greater than the predetermined level when the weather at the boarding position at the time of the boarding event is rain or snow. On the other hand, the determination unit 44 determines that the amount of moisture brought in is not greater than the predetermined level when the weather at the boarding position at the time of the boarding event is something other than rain or snow (for example, the weather is cloudy or fair). Accordingly, in the first example, the predetermined level is 0. The weather at the boarding position at the time of the boarding event does not have to be weather which is accurately associated with the time point at which the boarding event is detected, but may be weather of a time zone (for example, a time zone of one hour) in which the time point at which the boarding event is detected is included.

In a modified example of the first example, even when the weather at the boarding position at the time of the boarding event is something other than rain or snow, the determination unit 44 determines that the amount of moisture brought in is greater than the predetermined level if the weather at the boarding position at one time point in a predetermined period T1 prior to the boarding event was rainy or snowy. This is because, even when the weather is fair at the boarding position at the time of the boarding event, if there was rain or snow before the boarding event, there is a high possibility that an occupant will board the vehicle with an umbrella that became wet during the rain or snow or wearing wet clothing. In this case, the predetermined time T1 is a relatively short time. From the same point of view, even when the weather at the boarding position at the time of the boarding event is something other than rain or snow, the determination unit 44 determines that the amount of moisture brought in is greater than the predetermined level if there is snow cover at the boarding position at the time of the boarding event or if there was snow cover at the boarding position within the predetermined time T1 before the boarding event. This is because there is a high possibility that an occupant will board the vehicle with snow attached to the her or his shoes when the weather at the boarding position at the time of the boarding event is, for example, fair but there is snow cover at the boarding position.

In another modified example of the first example, the determination unit 44 determines whether the amount of moisture brought in is greater than the predetermined level on the basis of weather information at the boarding position and attribute information of the boarding position. The attribute information of the boarding position is information indicating an attribute of a parking lot as an attribute of the boarding position. The attribute information of the boarding position is, for example, information indicating whether the boarding position is in a parking lot, whether the parking lot is outdoors when the boarding position is in a parking lot, whether there is a roof or an awning when the parking lot is outdoors, or whether the parking lot is a parking area at a residence. For example, the attribute information of the boarding position may be included in a map database of a navigation device (not illustrated) or may be acquired from an external server (not illustrated). For example, when it is determined that the weather at the boarding position is rain or snow on the basis of the weather information and the boarding position is not a parking lot or the boarding position is in an outdoor parking lot without a roof or an awning, the determination unit 44 determines that the amount of moisture brought in is greater than the predetermined level. For example, when it is determined that the weather at the boarding position is rain or snow on the basis of the weather information but the boarding position is in an indoor parking lot, in an outdoor parking lot with a roof or an awning, or in a parking area at a residence, the determination unit 44 determines that the amount of moisture brought in is not greater than the predetermined level.

In a second example, the determination unit 44 calculates an index value (which will be described later) indicating the amount of moisture brought in on the basis of the weather information at the boarding position or the like, and determines that the amount of moisture brought in is greater than a predetermined level when the index value is greater than a predetermined threshold value Th0. Accordingly, in the second example, the predetermined threshold value Th0 corresponds to the predetermined level. An example of the method of calculating the index value will be described later.

The determination unit 44 changes a brought-in moisture flag which is control information associated with the control of the air-conditioning device 10. The state of the brought-in moisture flag is switched between "0" and "1." The state of the brought-in moisture flag is control information which is stored in a storage unit (for example, the RAM 12 or the auxiliary storage device 14 in a period in which the start switch turned off). An example of the "control information" in claim 1 of the claims is the state of the brought-in moisture flag in the first embodiment. When it is determined that the amount of moisture brought in is greater than the predetermined level, the determination unit 44 sets the brought-in moisture flag to "1." An initial value of the brought-in moisture flag is "0." When the brought-in moisture flag is set to "1," the determination unit 44 holds the brought-in moisture flag at "1" until a predetermined reset condition is satisfied thereafter. When the reset condition is satisfied, the determination unit 44 resets the brought-in moisture flag to "0." The reset condition is satisfied, for example, when an elapsed time from a time at which it is latest determined that the amount of moisture brought in is greater than the predetermined level reaches a predetermined time Tp. Another example of the reset condition will be described later.

The control unit 46 controls the air-conditioning device 10. In the following description, a state in which the operation mode is the automatic mode will be described unless particularly mentioned. In the manual mode, the control unit 46 controls the blower air volume and the opening level of the air mix door 124 on the basis of an operated position of the blower dial and an operated position (a set temperature) of the temperature setting dial, regardless of the state of the brought-in moisture flag.

The control unit 46 controls the air-conditioning device 10 on the basis of the state of the brought-in moisture flag. When the brought-in moisture flag is set to "1," the control unit 46 sets the ventilation capacity of the air-conditioning device 10 to be higher than when the brought-in moisture flag is set to "0." The higher the outside air introduction rate becomes, the higher the ventilation capacity of the air-conditioning device 10 becomes. When the outside air introduction rate is significantly higher than 0%, the higher the rotation speed of the blower motor 122 becomes, the higher ventilation capacity of the air-conditioning device 10 becomes. Under the condition of the same rotation speed of the blower motor 122 when the outside air introduction rate is significantly higher than 0%, the longer a ventilation time becomes, the higher the ventilation capacity of the air-conditioning device 10 becomes. For example, when the brought-in moisture flag is set to "1," the control unit 46 sets the ventilation capacity of the air-conditioning device 10 to be higher than when the brought-in moisture flag is set to "0" in a period until the brought-in moisture flag is switched to "0."

In an example, the control unit 46 sets the outside air introduction rate to a first outside air introduction rate (for example, 0%) when the brought-in moisture flag is set to "0," and sets the outside air introduction rate to a second outside air introduction rate (>the first outside air introduction rate: for example, 100%) when the brought-in moisture flag is set to "1." The outside air introduction rate can be changed by adjusting the opening level of the outside/inside air door 119. In another example, the control unit 46 sets the outside air introduction rate to the first outside air introduction rate and sets the rotation speed of the blower motor 122 to a first rotation speed N1 when the brought-in moisture flag is set to "0," and sets the outside air introduction rate to the second outside air introduction rate and sets the rotation speed of the blower motor 122 to a second rotation speed N2 (>the first rotation speed N1: for example, a maximum value) when the brought-in moisture flag is set to "1." In the following description, the above-mentioned control method which is used by the control unit 46 when the brought-in moisture flag is set to "0" is referred to as a "first control method," and the above-mentioned control method which is used by the control unit 46 when the brought-in moisture flag is set to "1" is referred to as a "second control method." The second control method may depend on whether the defroster mode (or the foot defroster mode) in which a defroster is used is turned on.

When the weather at the boarding position is rainy or snowy, there is a high possibility that an occupant or the occupant's belongings (such as an umbrella or a bag), clothes, shoes, and the like are wet before boarding the vehicle. Accordingly, when the weather at the boarding position is rainy or snowy, there is a high possibility that moisture is brought in. Therefore, when the weather at the boarding position is rainy or snowy, there is a concern that cloudiness of a window (for example, a front windshield) will start immediately after departure due to the carried moisture.

In this regard, according to the above-mentioned air-conditioning control system 1, when it is determined that the amount of moisture brought in is greater than a predetermined level, the brought-in moisture flag is set to "1." When the brought-in moisture flag is set to "1," the control unit 46 controls the air-conditioning device 10 on the basis of the second control method. Accordingly, according to the air-conditioning control system 1, it is possible to enhance the ventilation capacity of the air-conditioning device 10 depending on the amount of moisture brought in. As a result, when there is a high necessity for ventilation due to the brought-in moisture, it is possible to automatically enhance the ventilation capacity of the air-conditioning device 10 such that cloudiness of the window does not occur. In this case, since the ventilation capacity of the air-conditioning device 10 can be enhanced immediately when the vehicle starts at the boarding position, it is possible to reduce the possibility that cloudiness of the window will occur immediately after departure due to the brought-in moisture and to reduce poor visibility or a driver's stress due to the cloudiness of the window. It is not necessary for a user to manually operate a switch for enhancing the ventilation capacity and it is possible to improve convenience to the user.

In recent years, there is a tendency to reduce exhaust heat due to improvement in efficiency of an internal combustion engine and there is a problem in that additional energy has to be used to acquire necessary heating capacity and thus fuel efficiency of a vehicle degrades. In a hybrid vehicle or an electric vehicle in which exhaust heat cannot be used, a heating load has a great influence on fuel efficiency or a cruising range. In order to reduce the heating load, it is useful to increase an inside air circulation rate and to decrease a ventilation loss. When the vehicle includes an internal combustion engine, it is useful to decrease the ventilation loss for the purpose of earlier warming-up of the internal combustion engine.

In this regard, according to the above-mentioned air-conditioning control system 1, when the brought-in moisture flag is not set to "1," the first control method is used, the ventilation capacity of the air-conditioning device 10 is lower than that in the second control method (that is, the inside air circulation rate is higher), and it is thus possible to decrease the ventilation loss. In this way, according to the air-conditioning control system 1, it is possible to decrease the ventilation loss and to reduce cloudiness of a window due to brought-in moisture.

According to the air-conditioning control system 1, since the above-mentioned advantages can be achieved without disposing a humidity sensor in the vehicle, there is an advantage in terms of costs.

Some operation examples of the control device 40 will be described below with reference to FIGS. 5 to 9B.

Figure 5:
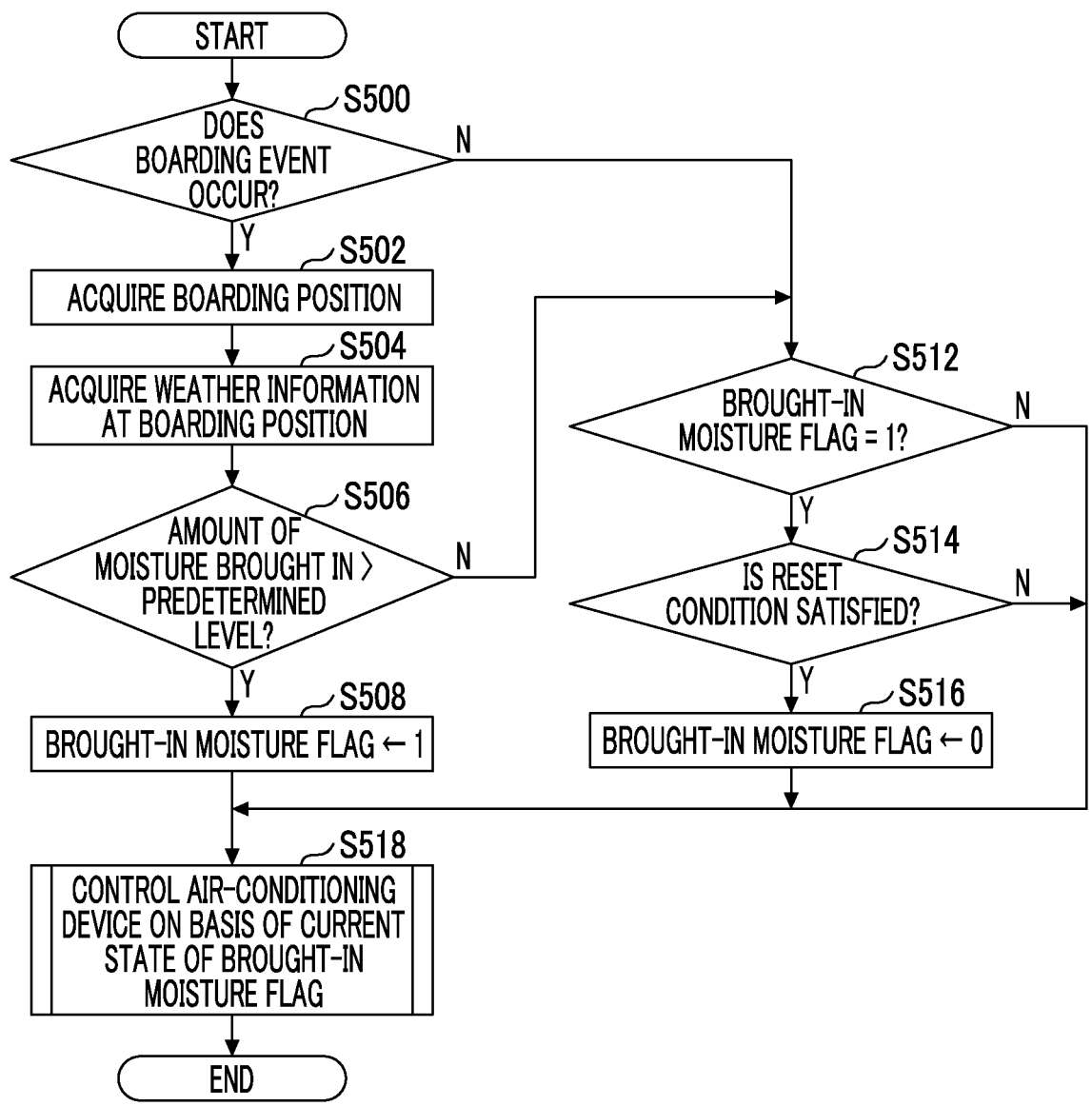
FIG. 5 is a flowchart schematically illustrating an example of a process flow which is performed by the control device.

FIG. 5 is a flowchart schematically illustrating an example of a process flow which is performed by the control device 40. The process flow illustrated in FIG. 5 is started, for example, when a start event of a vehicle occurs and is performed every predetermined cycle during operation of the vehicle (that is, while the start switch is in an ON state).

In Step S500, the boarding event detecting unit 41 determines whether a boarding event occurs. In FIG. 5, for example, the boarding event detecting unit 41 detects occurrence of the start event of the vehicle as the boarding event. Accordingly, when a first process flow after starting is performed, the boarding event detecting unit 41 determines that a boarding event occurs. The process of Step S502 is performed when the determination result is "YES," and the process of Step S512 is performed otherwise.

In Step S502, the weather information acquiring unit 42 acquires a current position (a boarding position) of the vehicle from the GPS receiver 81.

In Step S504, the weather information acquiring unit 42 acquires weather information at the boarding position via the communication module 82.

In Step S506, the determination unit 44 determines whether an amount of moisture brought in is greater than a predetermined level on the basis of the weather information acquired in Step S504. In FIG. 5, for example, when the weather at the boarding position at the time of the boarding event is rainy or snowy, the determination unit 44 determines that the amount of moisture brought in is greater than the predetermined level. The process of Step S508 is performed when the determination result is "YES," and the process of Step S512 is performed otherwise.

In Step S508, the determination unit 44 sets the brought-in moisture flag to "1."

In Step S512, the determination unit 44 determines whether the brought-in moisture flag is set to "1." The process of Step S514 is performed when the determination result is "YES," and the process of Step S518 is performed otherwise (that is, when the brought-in moisture flag is set to "0").

In Step S514, the determination unit 44 determines whether a reset condition is satisfied. In FIG. 5, for example, when an elapsed time from a time at which it is latest determined the amount of moisture brought in is greater than the predetermined level reaches a predetermined time Tp (a fixed value), the determination unit 44 determines that the reset condition is satisfied. The process of Step S516 is performed when the determination result is "YES," and the process of Step S518 is performed otherwise.

In Step S516, the determination unit 44 resets the brought-in moisture flag to "0."

In Step S518, the control unit 46 controls the air-conditioning device 10 on the basis of the current state of the brought-in moisture flag. This control method is the same as described above.

According to the process flow illustrated in FIG. 5, it is determined whether the amount of moisture brought in is greater than the predetermined level whenever the start switch of the vehicle is switched from OFF to ON, and it is possible to enhance the ventilation capacity of the air-conditioning device 10 when it is determined that the amount of moisture brought in is greater than the predetermined level. When the reset condition is satisfied in the state in which the ventilation capacity of the air-conditioning device 10 is enhanced, it is possible to release the state in which the ventilation capacity of the air-conditioning device 10 is enhanced.

Figure 6:
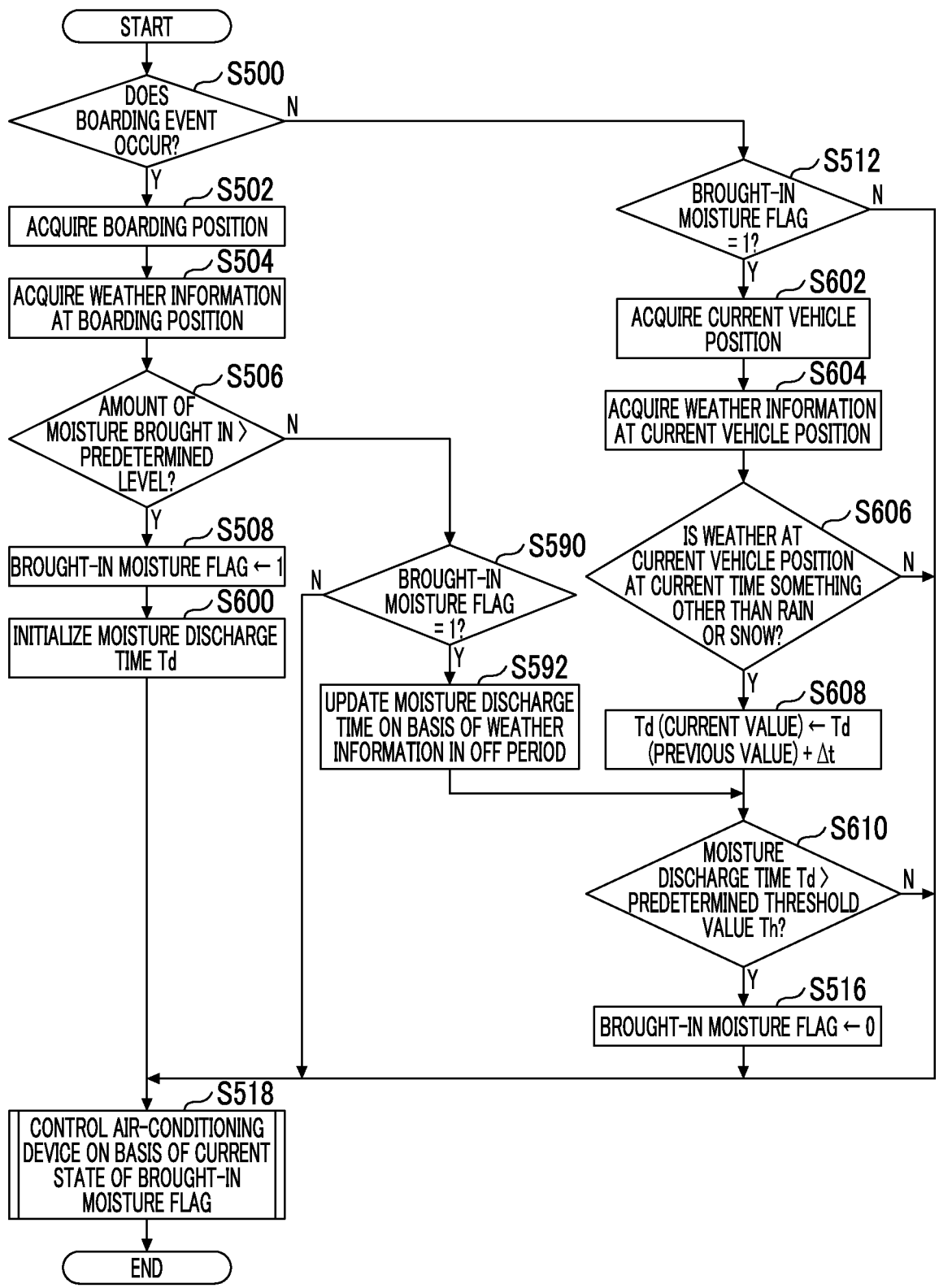
FIG. 6 is a flowchart schematically illustrating another example of the process flow which is performed by the control device.

FIG. 6 is a flowchart schematically illustrating another example (an alternative of the example illustrated in FIG. 5) of a process flow which is performed by the control device 40. The process flow illustrated in FIG. 6 is started, for example, when a start event of a vehicle occurs and is performed every predetermined cycle during operation of the vehicle.

In FIG. 6, the same processes as illustrated in FIG. 5 will be referenced by the same step numbers and description thereof will not be repeated. The process flow illustrated in FIG. 6 is different from the process flow illustrated in FIG. 5, in that Step S600 is additionally performed between Step S508 and Step S518 and Steps S602 to S610 are performed instead of Step S514. The process flow illustrated in FIG. 6 is also different from the process flow illustrated in FIG. 5, in that, when the determination result of Step S506 is "NO," Step S590 is performed. The differences will be described below.

In FIG. 6, for example, the weather information acquiring unit 42 similarly acquires the weather information at the boarding position of the vehicle in Step S504, but it is assumed herein that the acquired information is weather information indicating the weather (including the weather at the current time) over the longer period of a predetermined period T1 before the current time and a period in which the start switch is turned off latest. In FIG. 6, for example, when the weather at the boarding position at at least one time point in the predetermined period T1 before the current time is rainy or snowy, the determination unit 44 determines that the amount of moisture brought in is greater than the predetermined level in Step S506.

In Step S590, the determination unit 44 determines whether the brought-in moisture flag is set to "1." The process of Step S592 is performed when the determination result is "YES," and the process of Step S518 is performed otherwise.

In Step S592, the determination unit 44 adds a period in which the weather at the vehicle position is other than rainy or snowy in the period in which the start switch is turned off latest to a current value of a moisture discharge time Td on the basis of the weather information acquired in Step S504 to update the moisture discharge time Td. When the process of Step S592 ends, the process of Step S610 is performed. The moisture discharge time Td represents an integrated value of a time in which there is neither rain nor snow before the current time (a time in which an amount of rainfall/snowfall is 0). While there is neither rain nor snow, discharge of moisture from the vehicle due to ventilation is promoted and thus the moisture discharge time Td can be used to estimate a timing at which the brought-in moisture is discharged to the outside due to ventilation. An initial value and a count start timing of the moisture discharge time Td will be described later.

In Step S600, the determination unit 44 calculates the initial value of (initializes) the moisture discharge time Td on the basis of the weather information acquired in Step S504. When the weather at the current time is rainy or snowy, the determination unit 44 sets the initial value to 0. On the other hand, when falling of rain or snow ends at a time point prior by a time T2 (<T1) to the current time, the determination unit 44 sets the initial value to T2.

In Step S602, the weather information acquiring unit 42 acquires the current position of the vehicle from the GPS receiver 81.

In Step S604, the weather information acquiring unit 42 acquires weather information at the current position of the vehicle via the communication module 82.

In Step S606, the determination unit 44 determines whether the weather at the current position of the vehicle is other than rainy or snowy on the basis of the weather information acquired in Step S604. The process of Step S608 is performed when the determination result is "YES," and the process of Step S518 is performed otherwise.

In Step S608, the determination unit 44 adds a predetermined time Δt to the current value of the moisture discharge time Td to update the moisture discharge time Td. The predetermined time Δt corresponds to a processing cycle.

In Step S610, the determination unit 44 determines whether the moisture discharge time Td is greater than a predetermined threshold value Th. The predetermined threshold value Th corresponds to a time required until the brought-in moisture disappears by the enhanced ventilation capacity of the air-conditioning device 10 and is appropriately determined by experiment or the like. For example, the predetermined threshold value Th may be appropriately determined such that the state in which the brought-in moisture flag is set to "1" is maintained until interior members in the vehicle interior which has been wet due to the brought-in moisture is dried as described above. Alternatively, the predetermined threshold value Th may be simply, for example, 24 hours. The process of Step S516 is performed when the determination result is "YES," and the process of Step S518 is performed otherwise.

According to the process flow illustrated in FIG. 6, it is determined whether the amount of moisture brought in is greater than the predetermined level whenever the start switch of the vehicle is switched from OFF to ON, and the brought-in moisture flag is set to "1" when it is determined that the amount of moisture brought in is greater than the predetermined level. When the brought-in moisture flag is set to "1," the initial value of the moisture discharge time Td is calculated (initialized). Thereafter, the moisture discharge time Td is updated to increase with an increase in the time in which the weather at the vehicle position is other than rainy or snowy, and the brought-in moisture flag is reset to "0" when the moisture discharge time Td is greater than the predetermined threshold value Th.

Figure 7:
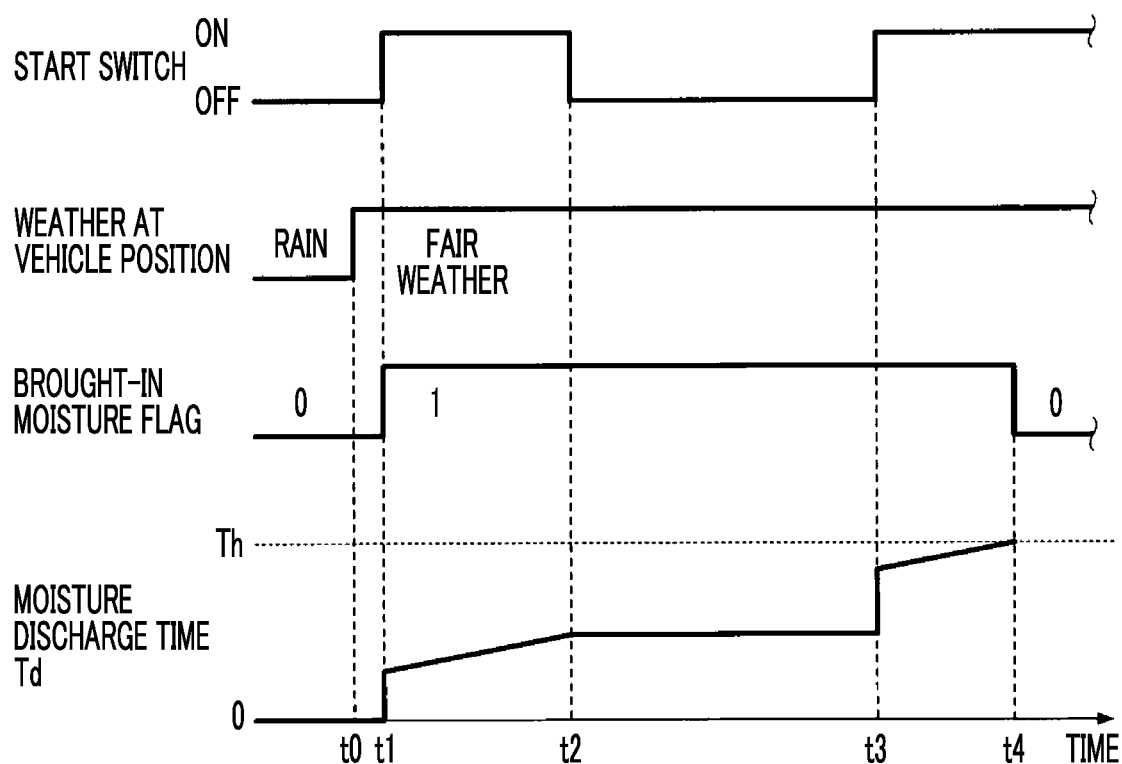
FIG. 7 is a diagram illustrating the process flow illustrated in FIG. 6.

FIG. 7 is a diagram illustrating the process flow illustrated in FIG. 6. In FIG. 7, the state of the start switch, the weather at the current position of the vehicle (the weather indicated by the weather information), the state of the brought-in moisture flag, and the moisture discharge time Td are sequentially illustrated from the uppermost in time series. The predetermined threshold value Th appears together in time series of the moisture discharge time Td.

In FIG. 7, a boarding event at time t1 occurs, for example, at point A (not illustrated). The weather at time t1 is fair, but the weather at time t0 prior to time t1 is rainy. In FIG. 7, t1−t0<T1 is satisfied and thus the brought-in moisture flag is set to "1" to correspond to the boarding event at time t1. At this time, since the weather at time t1 is fair, the value (that is, the initial value) of the moisture discharge time Td at time t1 corresponds to t1−t0. After time t1, the vehicle reaches, for example, point B (not illustrated) at time t2 and the start switch is turned off. After time t1, the weather at the vehicle position (for example, the vehicle position varies while moving to point B) is maintained to be fair and the moisture discharge time Td increases until the vehicle reaches point B. The moisture discharge time Td is not updated in the period in which the start switch is turned off after reaching point B, but when a boarding event occurs at point B at time t3 thereafter, the period in which the weather is fair in the period in which the start switch is turned off latest is added to update the moisture discharge time Td. When the boarding event at point B occurs (at time t3), the moisture discharge time Td does not reach the predetermined threshold value Th still and thus the brought-in moisture flag is maintained to be "1." Accordingly, similarly to when the vehicle starts at time t1, the ventilation capacity of the air-conditioning device 10 can also be enhanced when the vehicle starts at time t3. Thereafter, at time t4, the moisture discharge time Td reaches the predetermined threshold value Th and the brought-in moisture flag is reset to "0." As a result, the state in which the ventilation capacity of the air-conditioning device 10 has been enhanced is released at time t4.

In this way, according to the process flow illustrated in FIG. 6, the state in which the ventilation capacity of the air-conditioning device 10 has been enhanced can be released at the timing at which it is estimated that the brought-in moisture is discharged to the outside by ventilation on the basis of the moisture discharge time Td.

Here, moisture brought into the vehicle interior (brought-in moisture) with boarding the vehicle such as moisture attached to an umbrella, a bag, or the like permeates interior members of the vehicle interior (for example, a fabric interior member such as a floor carpet), and thus the interior members may be maintained to be wet even when the umbrella, the bag, or the like is carried out of the vehicle along with an occupant after the start switch is turned off. In this regard, according to the process flow illustrated in FIG. 6, when the brought-in moisture flag is once set to "1," the brought-in moisture flag is not reset even when the start switch is turned off as long as the moisture discharge time Td does not reach the predetermined threshold value Th.

Accordingly, according to the process flow illustrated in FIG. 6, even when the umbrella, the bag, or the like is taken out of the vehicle along with the occupant after the start switch is turned off, the ventilation capacity of the air-conditioning device 10 may be enhanced when a next boarding event occurs. Accordingly, according to the process flow illustrated in FIG. 6, it is possible to increase the possibility that the ventilation capacity of the air-conditioning device 10 will be enhanced when the interior members are maintained to be wet in a boarding event due to the moisture which has been brought in at the time of the previous boarding event.

In FIG. 6, the determination unit 44 can initialize the moisture discharge time Td to a value larger than 0 in Step S600, but the disclosure is not limited thereto. For example, in Step S600, the determination unit 44 may always initialize the moisture discharge time Td to 0.

In FIG. 6, when the weather at the boarding position at at least one time point in the predetermined period T1 prior to the current time is rainy or snowy, the determination unit 44 determines that the amount of moisture brought in is greater than the predetermined level in Step S506, but the disclosure is not limited thereto. For example, in Step S506, the determination unit 44 may be configured to determine that the amount of moisture brought in is greater than the predetermined level only when the weather at the boarding position at the time of the boarding event is rainy or snowy. In this case, in Step S600, the determination unit 44 always initializes the moisture discharge time Td to 0.

Figure 8:
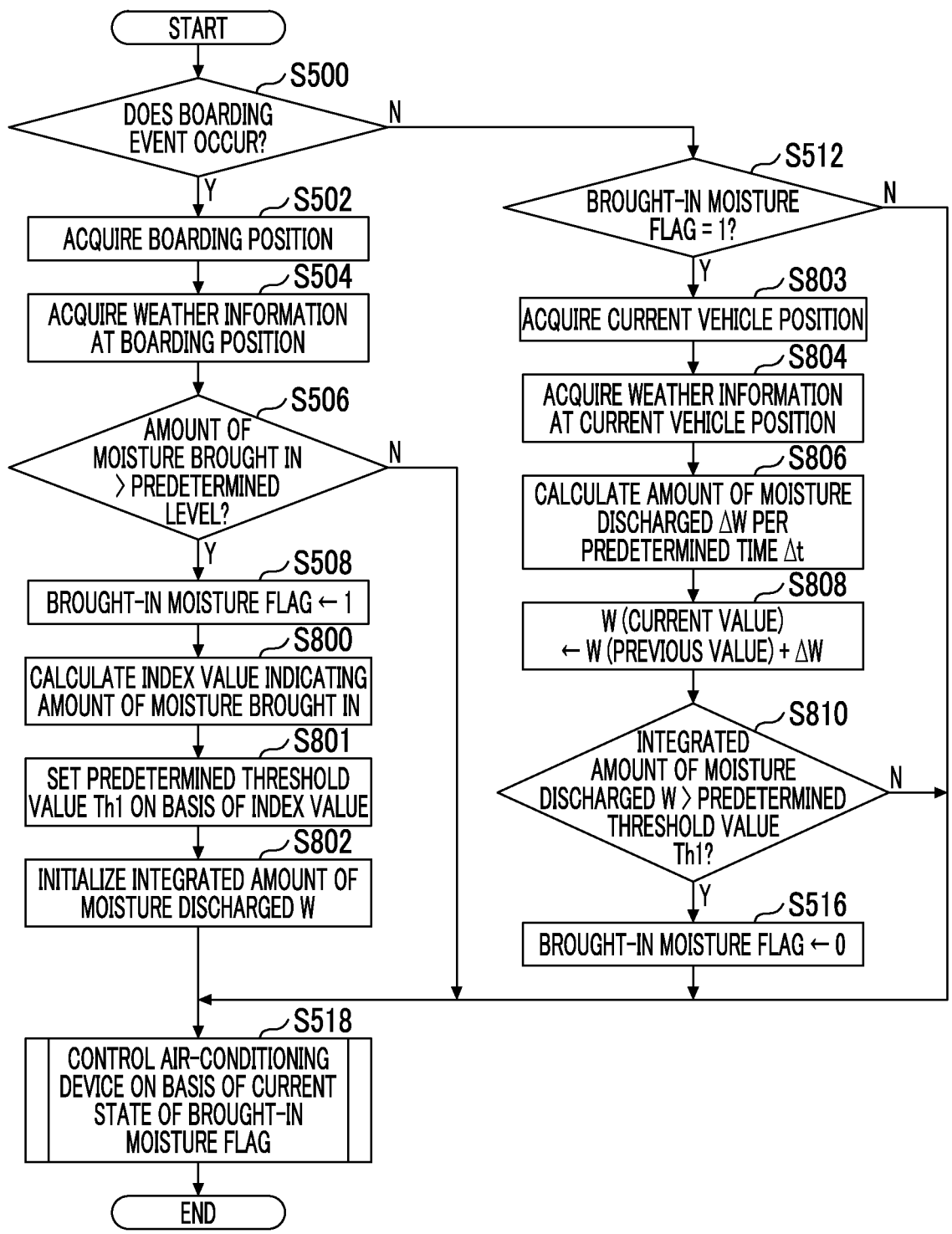
FIG. 8 is a flowchart schematically illustrating another example of the process flow which is performed by the control device.

FIG. 8 is a flowchart schematically illustrating another example (an alternative of the example illustrated in FIG. 5) of a process flow which is performed by the control device 40. The process flow illustrated in FIG. 8 is started, for example, when a start event of a vehicle occurs and is performed every predetermined cycle during operation of the vehicle.

In FIG. 8, the same processes as illustrated in FIG. 5 will be referenced by the same step numbers and description thereof will not be repeated. The process flow illustrated in FIG. 8 is different from the process flow illustrated in FIG. 5, in that Steps S800 to S802 are additionally performed between Step S508 and Step S518 and Steps S803 to S810 are performed instead of Step S514. The process flow illustrated in FIG. 8 is also different from the process flow illustrated in FIG. 5, in that, when the determination result of Step S506 is "NO," Step S518 is performed. The differences will be described below.

In Step S800, the determination unit 44 calculates an index value indicating the amount of moisture brought in due to the boarding event detected in Step S500. The index value is calculated using the number of occupants as a parameter. The index value increases as the number of occupants increases. In addition, the index value may be calculated using an amount of rainfall, an occupant's physical constitution, the number of umbrellas, a time in which a boarding occupant is present in the vehicle exterior, and the like as additional parameters. The index value increases as the amount of rainfall or the number of umbrellas increases, increases as the occupant's physical constitution increases, and increases as the time in which the occupant is present in the vehicle exterior increases.

Herein, for example, the determination unit 44 calculates the index value using maps illustrated in FIGS. 9A and 9B. The index value is an increase in absolute humidity (weight absolute humidity) [g/kg]. FIG. 9A illustrates a relationship between the number of occupants and the increase in absolute humidity, and FIG. 9B illustrates a relationship between the number of umbrellas and the increase in absolute humidity. The number of occupants can be determined on the basis of a seat sensor, a door switch, a seat belt sensor, or the like. The number of umbrellas is the same as the number of occupants. For example, when the number of occupants is two, 0.8 is extracted from FIG. 9A, 0.6 is extracted from FIG. 9B, and the increase in absolute humidity is 1.4 in total.

In a case in which a physical constitution is considered, for example, values obtained by multiplying the values in the map illustrated in FIG. 9A by 0.8 may be used when the occupant is an adult female, and values obtained by multiplying the values in the map illustrated in FIG. 9A by 0.5 may be used when the occupant is a child. The physical constitution can be determined by a weight sensor of a seat, image recognition, or the like. In a case in which the amount of rainfall (the same is true of an amount of snowfall) and the time in which the occupant is present in the vehicle exterior, when a value obtained by multiplying an amount of rainfall per hour (mm/h) by the time in which the occupant is present in the vehicle exterior is equal to or less than 5 mm, values obtained by multiplying the values in the map illustrated in FIG. 9B by 0.5 may be used. The time in which the occupant is present in the vehicle exterior can be determined on the basis of an ON/OFF history of the door switch. The amount of rainfall can be acquired as a part of the weather information.

The determination unit 44 may additionally correct the index value on the basis of attribute information of a boarding position. For example, when the boarding position is an outdoor parking lot with a roof, values obtained by multiplying the values in the map illustrated in FIG. 9B by 0.5 may be used.

In Step S801, the determination unit 44 sets a predetermined threshold value Th1 corresponding to the index value calculated in Step S800. The determination unit 44 sets the predetermined threshold value Th1 such that the predetermined threshold value Th1 increases as the index value increases. In FIG. 8, for example, the determination unit 44 sets the predetermined threshold value Th1 as the index value.

In Step S802, the determination unit 44 initializes an integrated amount of moisture discharged W [g/kg] to 0. The integrated amount of moisture discharged W is an integrated value of an amount of moisture discharged from the vehicle by ventilation.

In Step S803, the weather information acquiring unit 42 acquires a current position of the vehicle from the GPS receiver 81.

In Step S804, the weather information acquiring unit 42 acquires the weather information at the current position of the vehicle via the communication module 82. Herein, it is assumed that the weather information includes information of humidity at the current position of the vehicle. The humidity at the vehicle position is humidity outside the vehicle and corresponds to outside air humidity.

In Step S806, the determination unit 44 calculates an amount of moisture discharged from the vehicle by ventilation of the air-conditioning device 10 (hereinafter referred to as an "amount of moisture discharged") [g/kg] on the basis of outside air temperature information, outside air humidity information, and inside air temperature information of the current time. Here, the determination unit 44 calculates an amount of moisture discharged $\Delta W$ per predetermined time $\Delta t$. The predetermined time $\Delta t$ corresponds to the processing cycle. For example, the amount of moisture discharged $\Delta W$ can be calculated by calculating a ventilation air volume per predetermined time $\Delta t$ on the basis of a blower air volume or the like and subtracting an amount of moisture included in outside air corresponding to the ventilation air volume from the amount of moisture included in inside air corresponding to the ventilation air volume. The amount of moisture included in the inside air is calculated on the basis of the current inside air temperature (which is acquired from an inside air temperature sensor as an element of the air-conditioner-related sensor 86) with relative humidity of inside air as 100%. The amount of moisture included in the outside air can be calculated on the basis of the weather information (the outside air humidity) and the outside air temperature acquired in Step S804. As the outside air temperature, a detected value of the outside air temperature sensor (which is an element of the air-conditioner-related sensor 86) or the outside air temperature information which may be included in the weather information can be used.

In Step S808, the determination unit 44 adds the amount of moisture discharged ΔW calculated in Step S806 to the current value of the integrated amount of moisture discharged W to update the integrated amount of moisture discharged W.

In Step S810, the determination unit 44 determines whether the integrated amount of moisture discharged W is greater than the predetermined threshold value Th1 set in Step S801. The process of Step S516 is performed when the determination result is "YES," and the process of Step S518 is performed otherwise.

According to the process flow illustrated in FIG. 8, it is determined whether the amount of moisture brought in is greater than the predetermined level whenever the start switch of the vehicle is turned on, and the brought-in moisture flag is set to "1" and the index value indicating the amount of moisture brought in is calculated when it is determined that the amount of moisture brought in is greater than the predetermined level. Thereafter, the integrated amount of moisture discharged W which is an integrated value of the amount of moisture discharged by ventilation of the air-conditioning device 10 is updated and the brought-in moisture flag is reset to "0" when the integrated amount of moisture discharged W is greater than the predetermined threshold value Th1. The predetermined threshold value Th1 is determined depending on the index value. In this way, according to the process flow illustrated in FIG. 8, it is possible to accurately estimate the timing at which brought-in moisture is completely discharged to the outside by ventilation by calculating the index value and the integrated amount of moisture discharged W. Accordingly, it is possible to achieve optimization of duration of the state in which the ventilation capacity of the air-conditioning device 10 has been enhanced by changing the duration of the state in which the ventilation capacity of the air-conditioning device 10 has been enhanced depending on the index value.

In FIG. 8, the index value is used to determine the predetermined threshold value Th1, but the disclosure is not limited thereto. For example, when the index value is greater than the predetermined threshold value Th0 as described above, the determination unit 44 may determine that the amount of moisture brought in is greater than the predetermined level. That is, for example, the determination unit 44 may calculate the index value prior to Step S506 and may determine whether the index value is greater than the predetermined threshold value Th0 in Step S506.

The index value which is used in the process flow illustrated in FIG. 8 may also be used in the process flow illustrated in FIG. 6. Specifically, as a modified example of the process flow illustrated in FIG. 6, in Step S600, the determination unit 44 calculates an index value and sets a predetermined threshold value Th (the predetermined threshold value Th which is used in Step S610 of FIG. 6) on the basis of the calculated index value. In this case, the determination unit 44 sets the predetermined threshold value Th such that the predetermined threshold value Th increases as the index value increases. For example, the determination unit 44 may set the predetermined threshold value Th=5 [min] when the index value is equal to or less than 2 [g/kg], may set the predetermined threshold value Th=10 [min] when the index value ranges from 2 [g/kg] to 3 [g/kg], and may set the predetermined threshold value Th=a trip period when the index value is equal to or greater than 3 [g/kg]. When the predetermined threshold value Th is set to the trip period, the brought-in moisture flag is maintained to be "1" during the trip. Accordingly, when the predetermined threshold value Th is set to the trip period, Step S518 is performed when the determination result of Step S512 is "YES" in the process flow illustrated in FIG. 6, and the brought-in moisture flag is reset to "0" when the start switch is turned off. According to this modified example, it is possible to achieve optimization of the duration of the state in which the ventilation capacity of the air-conditioning device 10 has been enhanced by changing the duration of the state in which the ventilation capacity of the air-conditioning device 10 has been enhanced depending on the index value.

In the process flow illustrated in FIG. 8, similarly to the process flow illustrated in FIG. 6, discharge of moisture from the vehicle in the period in which the start switch is turned off latest may be considered. In this case, in FIG. 8, similarly to the process flow illustrated in FIG. 6, when the determination result of Step S506 is "NO" and the brought-in moisture flag is set to "1," the integrated amount of moisture discharged W is updated on the basis of the amount of moisture discharged in the period in which the start switch is turned off latest and then Step S810 is performed. The amount of moisture discharged in the period in which the start switch is turned off can be calculated by calculating a ventilation air volume (for example, a ventilation air volume per unit time×a length of the OFF period) by natural ventilation in the OFF period using the ventilation air volume (for example, an experiment value) per unit time by the natural ventilation and subtracting the amount of moisture included in outside air corresponding to the ventilation air volume from the amount of moisture included in inside air corresponding to the ventilation air volume. At this time, the amount of moisture included in the inside air is calculated with relative humidity set to 100%. As the inside air temperature, the inside air temperature when the start switch is turned off latest, the inside air temperature when the start switch is turned on latest, an average value thereof, or the like may be used. The amount of moisture included in the outside air can be calculated on the basis of a change of the weather information (the outside air humidity and the outside air temperature) in the OFF period.

Second Embodiment

An air-conditioning control system 1A according to a second embodiment is different from the air-conditioning control system 1 according to the first embodiment, in that the control device 40 is replaced with a control device 40A and a server 90 is added. In the following description, the differences will be described, the same elements will be reference by the same reference numerals, and description thereof will not be repeated.

Figure 10:
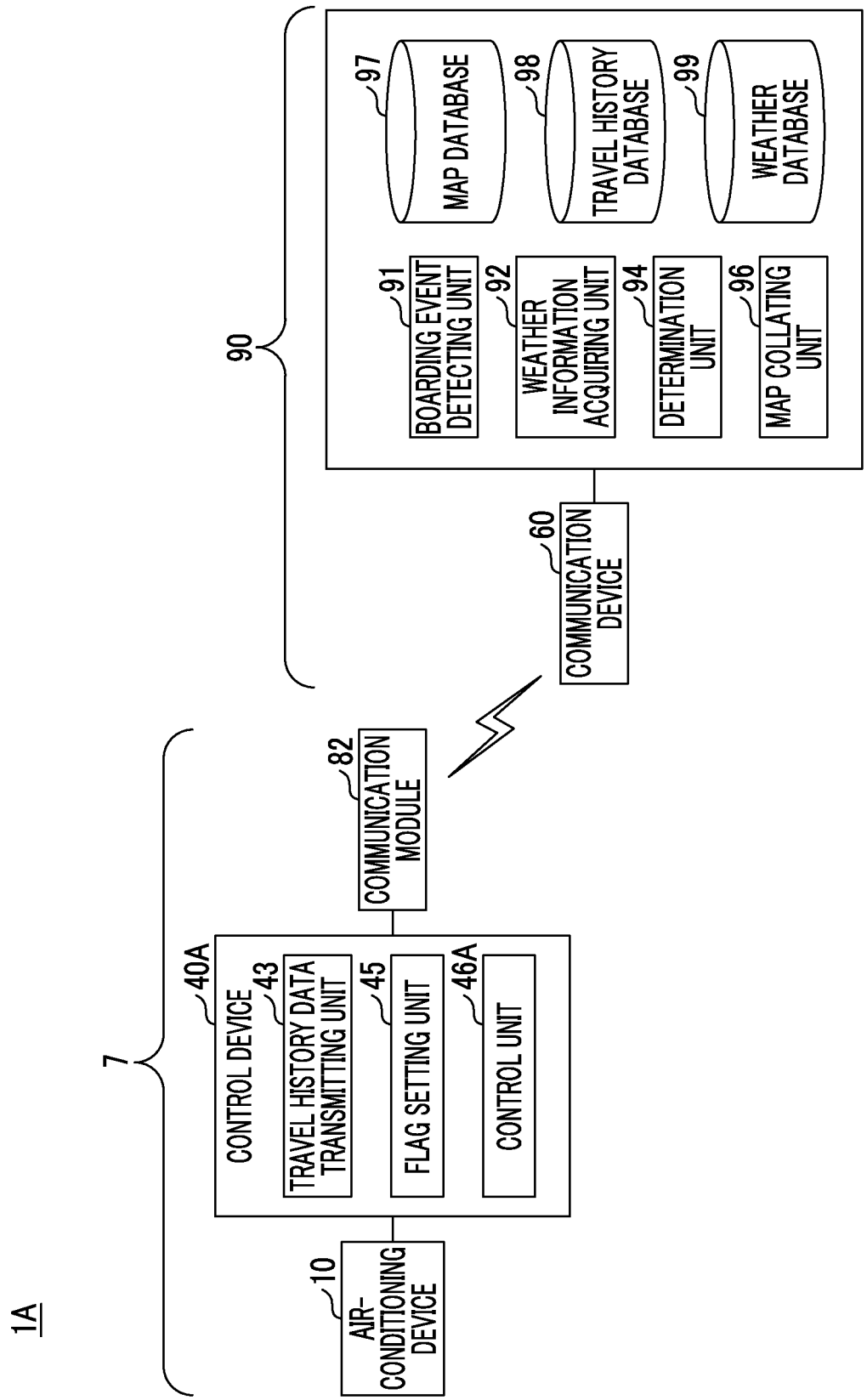
FIG. 10 is a diagram illustrating a basic configuration of an air-conditioning control system according to a second embodiment.

FIG. 10 is a diagram illustrating a basic configuration of the air-conditioning control system 1A according to the second embodiment.

The air-conditioning control system 1A includes an on-board device 7 mounted on a vehicle and a server 90 (which is an example of the information processing device). The on-board device 7 includes an air-conditioning device 10, a control device 40A, and a communication module 82 (which is an example of the communication unit). The on-board device 7 includes an on-board electronic device group 8 (see FIG. 4) in addition to the air-conditioning device 10 and the communication module 82. Similarly, in the following description, "the vehicle" means a vehicle on which the on-board device 7 is mounted unless particularly mentioned.

The hardware configuration of the control device 40A is the same as the hardware configuration of the control device 40 illustrated in FIG. 4. The control device 40A is different from the control device 40 according to the first embodiment, in that a travel history data transmitting unit 43, a flag setting unit 45, and a control unit 46A are provided instead of the weather information acquiring unit 42, the determination unit 44, and the control unit 46.

Specifically, the control device 40A includes the travel history data transmitting unit 43, the flag setting unit 45, and the control unit 46A. The travel history data transmitting unit 43, the flag setting unit 45, and the control unit 46A can be embodied by causing the CPU 11 to execute one or more programs stored in the ROM 13.

The travel history data transmitting unit 43 periodically transmits travel information during operation of the vehicle to the server 90. The travel history data transmitting unit 43 transmits the travel information to the server 90 via the communication module 82. The travel information includes a terminal identification (ID), a travel date and time, and a link ID. The terminal ID is the ID of the communication module 82. The link ID included in the travel information is associated with a link in which the vehicle travels. The link ID associated with the link in which the vehicle travels can be acquired on the basis of vehicle position information from the GPS receiver 81 and information in a map database (not illustrated). The link ID included in the travel information includes, for example, link IDs associated with all links through which the vehicle passes from the previous transmission cycle to the current transmission cycle. The travel date and time is, for example, a date and time of a time point of the current transmission cycle.

When the start switch is turned on/off, the travel history data transmitting unit 43 transmits start ON/OFF information to the server 90 via the communication module 82. The start ON/OFF information includes a terminal ID, a start ON/OFF date and time, and vehicle position information (latitude and longitude) at that time. OFF of an accessory switch may be used instead of OFF of the start switch.

The flag setting unit 45 changes a state of a hyperventilation flag on the basis of a set signal (which is an example of the second predetermined signal or the predetermined signal) and a reset signal (which is an example of the first predetermined signal) transmitted from the server 90. The function of the hyperventilation flag is the same as the function of the brought-in moisture flag in the first embodiment. When the set signal is received from the server 90 via the communication module 82, the flag setting unit 45 sets the hyperventilation flag to "1." In this way, the set signal from the server 90 serves as a command for setting the hyperventilation flag to "1" for the flag setting unit 45 (and a command for enhancing the ventilation capacity of the air-conditioning device on the basis of the second control method for the control unit 46A). When the reset signal is received from the server 90 via the communication module 82, the flag setting unit 45 resets the hyperventilation flag to "0." In this way, the reset signal from the server 90 serves as a command for resetting the hyperventilation flag to "0" for the flag setting unit 45.

The control unit 46A controls the air-conditioning device 10 on the basis of the state of the hyperventilation flag. The control unit 46A is the same as the control unit 46 according to the first embodiment, except that the state of the hyperventilation flag having the same function is used instead of the state of the brought-in moisture flag, and thus additional description thereof will not be made.

The server 90 is disposed remotely from the vehicle. The hardware configuration of the server 90 is not illustrated. A basic architecture (configuration) of the server 90 is substantially the same as the hardware configuration of the control device 40 illustrated in FIG. 4, except that a communication device 60 is provided, and both configurations are different in that a processing capability and a storage capacity are enhanced. The server 90 may be single unit or may be constituted, for example, by a plurality of server devices which are connected to each other via a network in a communicable manner.

The communication device 60 communicates with the communication module 82 of the vehicle. At the time of communication, the communication device 60 and the communication module 82 of the vehicle are connected to each other via a network including a radio communication network in a mobile phone. Examples of the network include the Internet, a world wide web (WWW), a virtual private network (VPN), a wide area network (WAN), and a wired network in addition to the radio communication network.

The server 90 includes a boarding event detecting unit 91, a weather information acquiring unit 92, a determination unit 94, a map collating unit 96, a map database 97, a travel history database 98, and a weather database 99. The boarding event detecting unit 91, the weather information acquiring unit 92, the determination unit 94, and the map collating unit 96 can be embodied by causing the CPU to execute one or more programs stored in the ROM. The databases such as the map database 97 can be embodied by an auxiliary storage device (such as a hard disk drive).

The boarding event detecting unit 91 detects a boarding event. For example, the boarding event detecting unit 91 detects occurrence of a start event of the vehicle as a boarding event. Occurrence of the start event of the vehicle can be detected on the basis of start ON/OFF information.

The weather information acquiring unit 92 acquires weather information indicating the weather at a current position of the vehicle. The weather information acquiring unit 92 acquires weather information at a boarding position of the vehicle from the weather database 99. For example, when a boarding event is detected by the boarding event detecting unit 91, the weather information acquiring unit 92 acquires weather information at the boarding position.

The determination unit 94 determines whether an amount of moisture brought in is greater than a predetermined level on the basis of the weather information acquired by the weather information acquiring unit 92. A basic idea of the determination method is the same as in the determination unit 44 according to the first embodiment and thus detailed description thereof will not be repeated.

The determination unit 94 changes a state of a ventilation promotion service flag which is control information associated with the control of the air-conditioning device 10. The state of the ventilation promotion service flag is switched between "0" and "1." The state of the ventilation promotion service flag is control information which is stored in a storage unit (such as a RAM 12) of the server 90. An example of the "control information" in claims 2 and 8 of the claims is the state of the ventilation promotion service flag in the second embodiment. When it is determined that the amount of moisture brought in is greater than the predetermined level, the determination unit 94 sets the ventilation promotion service flag to "1." An initial value of the ventilation promotion service flag is "0." When the ventilation promotion service flag is set to "1," the determination unit 94 maintains the ventilation promotion service flag at "1" until a predetermined condition (hereinafter referred to as a "flag releasing condition") is satisfied thereafter. When the flag releasing condition is satisfied, the determination unit 94 resets the ventilation promotion service flag to "0." The basic idea of the flag releasing condition is the same as the reset condition which is used by the determination unit 44 according to the first embodiment and detailed description thereof will not be made. The flag releasing condition is satisfied, for example, when an elapsed time from a time at which it is latest determined that the amount of moisture brought in is greater than the predetermined level reaches a predetermined time Tp. Another example of the flag releasing condition will be described later.

The determination unit 94 transmits the set signal to the communication module 82 of the vehicle via the communication device 60 when the ventilation promotion service flag is set to "1" and transmits the reset signal to the communication module 82 of the vehicle via the communication device 60 when the ventilation promotion service flag is set to "0." In the second embodiment, for example, when a boarding event is detected, the determination unit 94 transmits the set signal or the reset signal to the communication module 82 of the vehicle via the communication device 60 depending on the result of the first determination process. When the ventilation promotion service flag is reset from "1" to "0" during operation of the vehicle, the determination unit 94 transmits the reset signal to the communication module 82 of the vehicle via the communication device 60.

The map collating unit 96 collates travel information received from the travel history data transmitting unit 43 with data in the map database 97.

The map database 97 stores map data of the whole country. The travel history database 98 stores the travel information or the start ON/OFF information received from various vehicles including the vehicle. FIG. 11A conceptually illustrates an example of data of the travel information in the travel history database 98. FIG. 11A illustrates data associated with a certain travel information ID=j. The travel information ID is given for each trip. FIG. 11B conceptually illustrates an example of data of the start ON/OFF information in the travel history database 98. FIG. 11B illustrates data associated with a plurality of pieces of travel information ID. In FIGS. 11A and 11B, "*" indicates that certain corresponding information is present.

The weather database 99 stores weather information of the whole country. For example, the weather database 99 stores weather information corresponding to a certain period. The weather information stored in the weather database 99 may be the same as the weather information acquired by the weather information acquiring unit 42 according to the first embodiment, but may be more detailed information. A generation source of the weather information in the weather database 99 is arbitrary and may be, for example, a weather information server other than the server 90.

According to the air-conditioning control system 1A, the same advantages as in the air-conditioning control system 1 are obtained. That is, when the amount of moisture brought in is greater than the predetermined level, the ventilation promotion service flag is set to "1." When the ventilation promotion service flag is set to "1," the set signal is transmitted to the vehicle and the hyperventilation flag is set to "1." When the hyperventilation flag is set to "1," the control unit 46A controls the air-conditioning device 10 on the basis of the second control method. Accordingly, according to the air-conditioning control system 1A, it is possible to enhance the ventilation capacity of the air-conditioning device 10 depending on the amount of moisture brought in. According to the air-conditioning control system 1A, when the hyperventilation flag is not set to "1," the first control method is used, the ventilation capacity of the air-conditioning device 10 is set to be lower than that in the second control method, and it is thus possible to reduce a ventilation loss. As a result, according to the air-conditioning control system 1A, it is possible to reduce a ventilation loss and to reduce cloudiness of a window due to the brought-in moisture.

Some operation examples of the air-conditioning control system 1A will be described below with reference to FIGS. 12 to 14.

Figure 12:
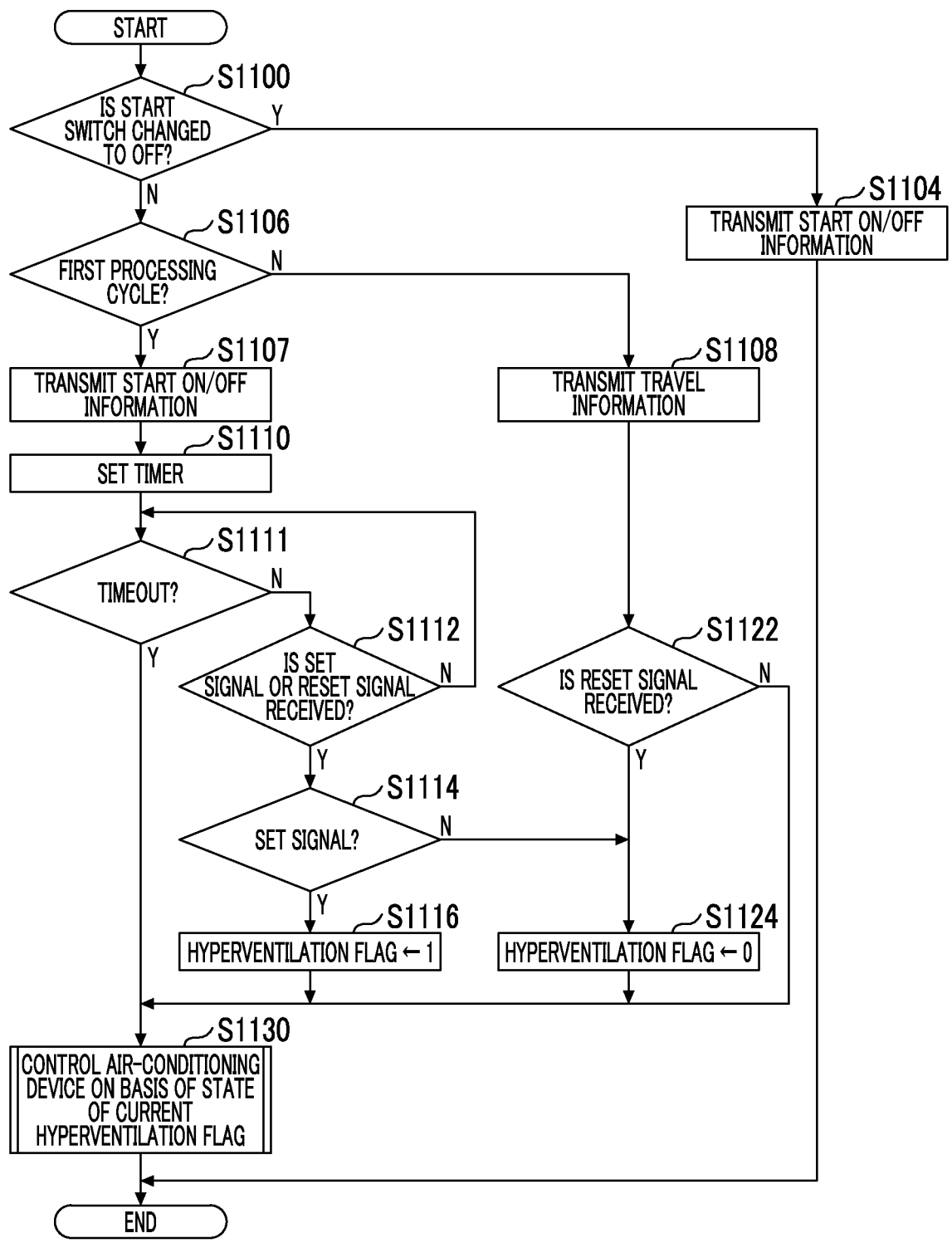
FIG. 12 is a flowchart schematically illustrating an example of a process flow which is performed by a control device.

FIG. 12 is a flowchart schematically illustrating an example of a process flow which is performed by the control device 40A of the on-board device 7. The process flow illustrated in FIG. 12 is started, for example, when the start switch is turned on and is performed every predetermined cycle during operation of the vehicle.

In Step S1100, the flag setting unit 45 determines whether the start switch is turned off. Step S1104 is performed when the determination result is "YES," and Step S1106 is performed otherwise (that is, when the start switch is turned on).

In Step S1104, the travel history data transmitting unit 43 transmits the start ON/OFF information (herein, start OFF information) to the server 90. When this process ends, the process flow illustrated in FIG. 12 ends until a next event in which the start switch is turned on occurs.

In Step S1106, the flag setting unit 45 determines whether the current processing cycle is a first processing cycle after starting. Step S1107 is performed when the determination result is "YES," and Step S1108 is performed otherwise.

In Step S1107, the travel history data transmitting unit 43 transmits the start ON/OFF information (herein, start ON information) to the server 90.

In Step S1108, the travel history data transmitting unit 43 transmits the travel information to the server 90.

In Step S1110, the flag setting unit 45 sets a timer. The timer times out in a predetermined time Tt after being set. The predetermined time Tt corresponds to, for example, a time required until the vehicle receives the set signal/reset signal (for example, see Step S1112 in FIG. 12) after the server 90 transmits the set signal/reset signal (for example, see Steps S1210/S1211 in FIG. 13) when a boarding event is detected (for example, see Step S1202 in FIG. 13).

In Step S1111, the flag setting unit 45 determines whether the timer times out. Step S1130 is performed when the determination result is "YES," and Step S1112 is performed otherwise.

In Step S1112, the flag setting unit 45 determines whether the set signal or the reset signal is received from the server 90. Step S1114 is performed when the determination result is "YES," and Step S1111 is performed otherwise.

In Step S1114, the flag setting unit 45 determines whether the received signal is the set signal. Step S1116 is performed when the determination result is "YES," and Step S1124 is performed otherwise (that is, when the received signal is the reset signal).

In Step S1116, the flag setting unit 45 sets the hyperventilation flag to "1."

In Step S1122, the flag setting unit 45 determines whether the reset signal is received from the server 90. Step S1124 is performed when the determination result is "YES," and Step S1130 is performed otherwise.

In Step S1124, the flag setting unit 45 resets the hyperventilation flag to "0."

In Step S1130, the control unit 46A controls the air-conditioning device 10 depending on the current state of the hyperventilation flag. This control method is the same as described above.

According to the process flow illustrated in FIG. 12, the set signal or the reset signal from the server 90 is received by the vehicle whenever the start switch of the vehicle is switched from OFF to ON, and the ventilation capacity of the air-conditioning device 10 can be switched depending on the received signal (the set signal or the reset signal). When the reset signal from the server 90 is received by the vehicle in a state in which the ventilation capacity of the air-conditioning device 10 has been enhanced in response to reception of the set signal from the server 90, it is possible to release the state in which the ventilation capacity of the air-conditioning device 10 has been enhanced.

Figure 13:
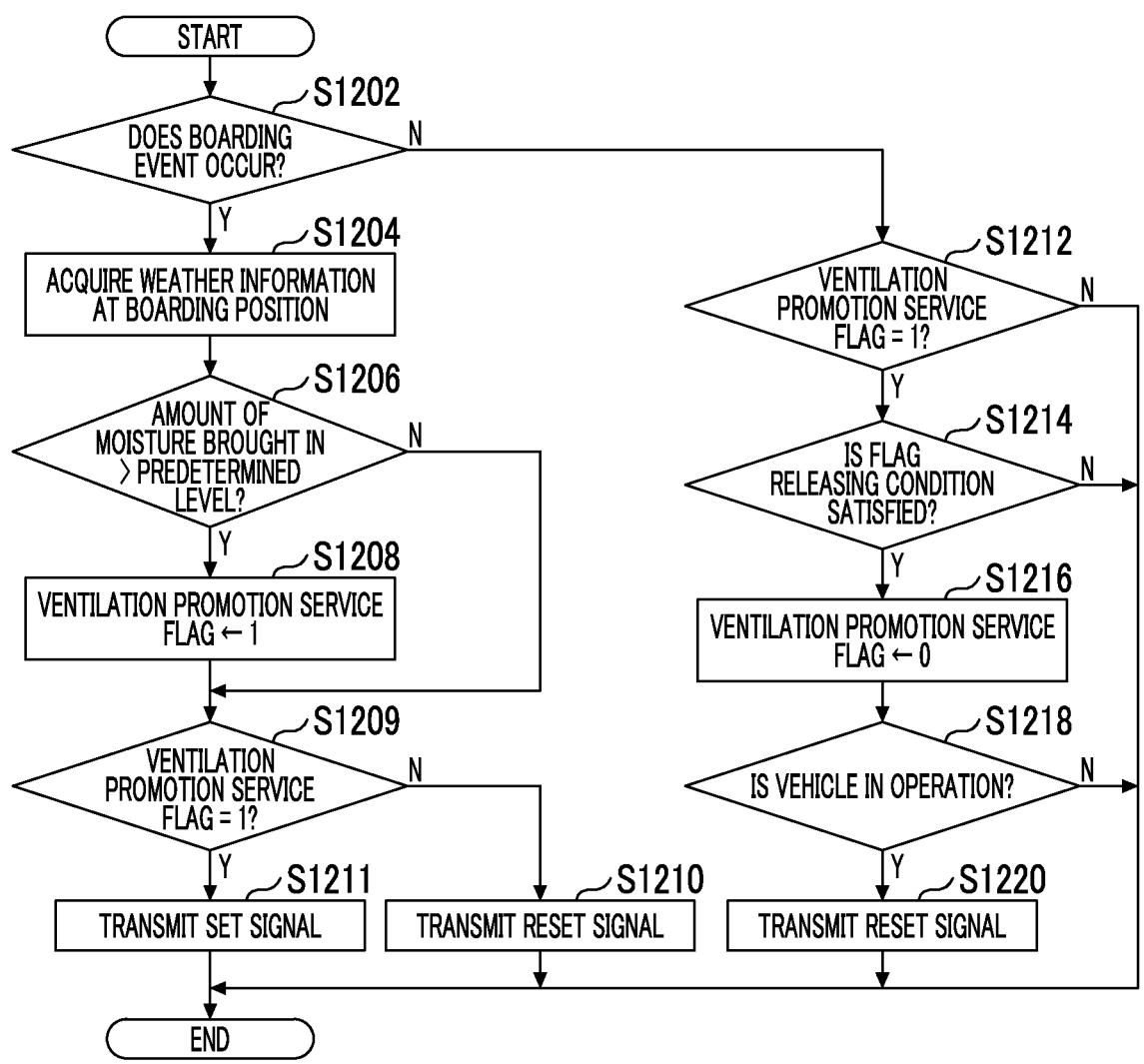
FIG. 13 is a flowchart schematically illustrating an example of a process flow which is performed by a server.

FIG. 13 is a flowchart schematically illustrating an example of a process flow which is performed by the server 90. The process flow illustrated in FIG. 13 is normally performed, for example, every predetermined cycle.

In Step 1202, the boarding event detecting unit 91 determines whether a boarding event occurs. The determination method thereof is the same as described above. Step S1204 is performed when the determination result is "YES," and Step S1212 is performed otherwise.

In Step S1204, the weather information acquiring unit 92 acquires the weather information at a boarding position from the weather database 99. The boarding position can be determined on the basis of the start ON/OFF information associated with a terminal ID (a terminal ID of the vehicle) by which the boarding event is detected.

In Step S1206, the determination unit 94 determines whether an amount of moisture brought in is greater than the predetermined level on the basis of the weather information acquired in Step S1204. The determination method thereof is the same as described above. Step S1208 is performed when the determination result is "YES," and Step S1209 is performed otherwise.

In Step S1208, the determination unit 94 sets the ventilation promotion service flag to "1."

In Step S1209, the determination unit 94 determines whether the ventilation promotion service flag is set to "1." Step S1211 is performed when the determination result is "YES," and Step S1210 is performed otherwise (that is, when the ventilation promotion service flag is set to "0").

In Step S1210, the determination unit 94 transmits the reset signal to the vehicle.

In Step S1211, the determination unit 94 transmits the set signal to the vehicle.

In Step S1212, the determination unit 94 determines whether the ventilation promotion service flag is set to "1." Step S1214 is performed when the determination result is "YES," and the process flow of the current cycle ends otherwise (that is, when the ventilation promotion service flag is set to "0").

In Step S1214, the determination unit 94 determines whether the flag releasing condition is satisfied. In FIG. 13, for example, the determination unit 94 determines that the flag releasing condition is satisfied when an elapsed time from a time at which it is latest determined that the amount of moisture brought in is greater than the predetermined level reaches a predetermined time Tp (a fixed value). In a modified example, the determination unit 94 may calculate and update a moisture discharge time Td as described above with reference to FIGS. 6 and 7, and may determine that the flag releasing condition is satisfied when the moisture discharge time Td is greater than the predetermined threshold value Th. Step S1216 is performed when the determination result is "YES," and the process flow of the current cycle ends otherwise.

In Step S1216, the determination unit 94 resets the ventilation promotion service flag to 0."

In Step S1218, the determination unit 94 determines whether the vehicle is in operation. Whether the vehicle is in operation can be determined on the basis of the travel information or the start ON/OFF information associated with the terminal ID (the terminal ID of the vehicle) by which the boarding event is detected. Step S1220 is performed when the determination result is "YES," and the process flow of the current cycle ends otherwise.

In Step S1220, the determination unit 94 transmits the reset signal to the vehicle.

According to the process flow illustrated in FIG. 13, the server 90 determines whether the amount of moisture brought in is greater than the predetermined level for each boarding event of the vehicle. When it is determined that the amount of moisture brought in is greater than the predetermined level, the set signal can be transmitted from the server 90 to the vehicle, thereby enhancing the ventilation capacity of the air-conditioning device 10 of the vehicle. When the flag releasing condition is satisfied in a state in which the ventilation promotion service flag is set to "1," the hyperventilation flag of the vehicle can be reset to "0" by transmitting the reset signal to the vehicle when the vehicle is in operation or the boarding event is detected.

Figure 14:
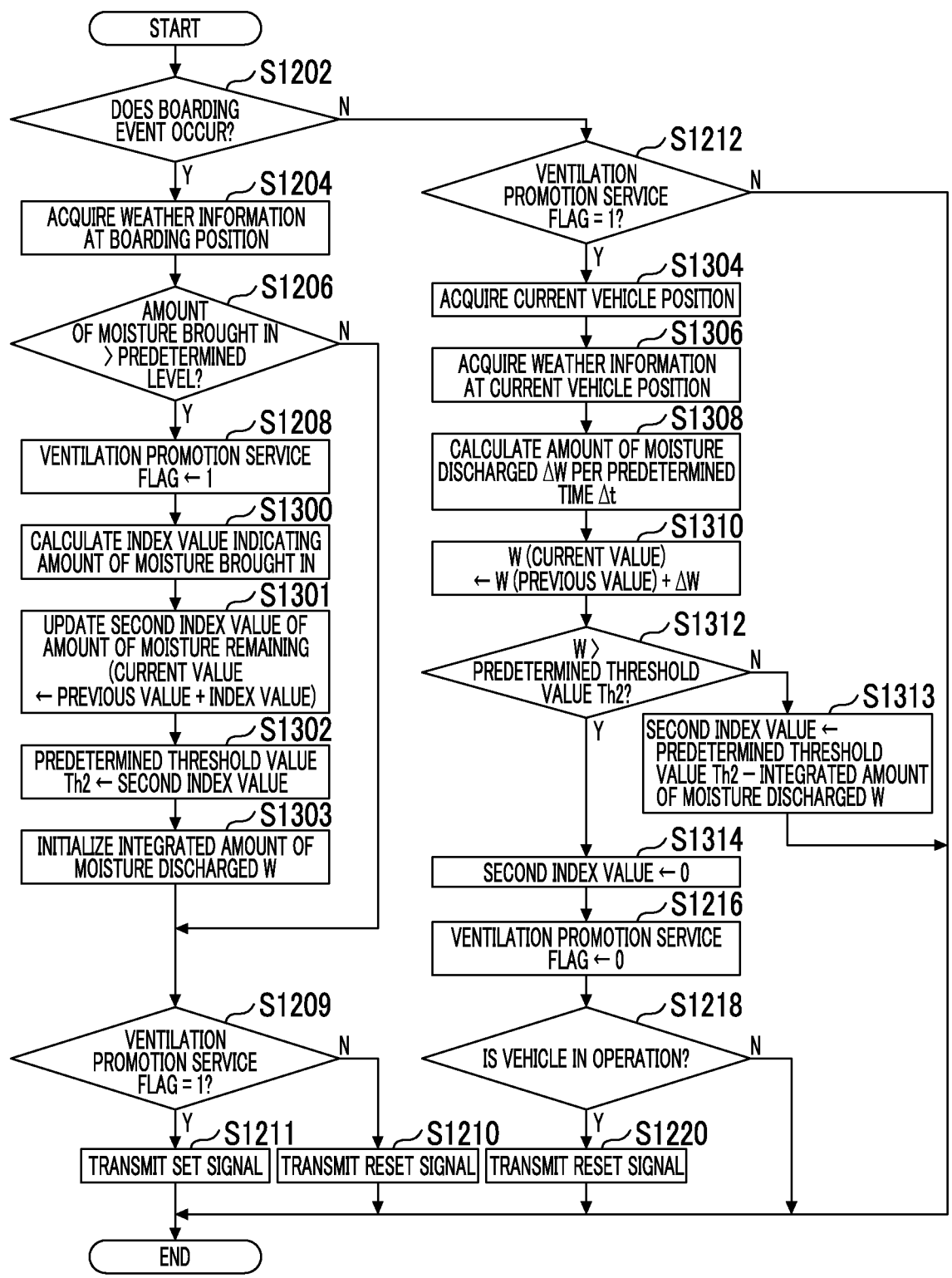
FIG. 14 is a flowchart schematically illustrating another example of the process flow which is performed by the server.

FIG. 14 is a flowchart schematically illustrating another example (an alternative of the example illustrated in FIG. 13) of the process flow which is performed by the server 90. The process flow illustrated in FIG. 14 is normally performed, for example, every predetermined cycle.

The process flow illustrated in FIG. 14 is different from the process flow illustrated in FIG. 13, in that Steps S1300 to S1303 are additionally performed between Steps S1208 and S1209 and Steps S1304 to S1314 are performed instead of Step S1214. The differences will be described below.

In FIG. 14, it is assumed that the travel information from the travel history data transmitting unit 43 of the vehicle includes an operation state of the air-conditioning device 10 of the vehicle (for example, a blower air volume) and a detected value of the air-conditioner-related sensor 86 (for example, an inside air temperature).

In Step S1300, the determination unit 94 calculates an index value indicating the amount of moisture brought in due to the boarding event detected in Step S1202. The method of calculating the index value is the same as described in Step S800 with reference to FIG. 8. For example, the index value is calculated using the number of occupants as a parameter. In this case, the vehicle also transmits information on the number of occupants at the same time as transmitting the start ON/OFF information to the server 90 (see Step S1107).

In Step S1301, the determination unit 94 adds the index value calculated in Step S1300 to the previous value of a second index value to update the second index value. The second index value is prepared for each terminal ID and the initial value of the second index value is 0 [g/kg]. The second index value is an index value indicating an amount of moisture remaining in the amount of moisture brought in at the time of the boarding event which can occur a plurality of times in the vehicle as will be described later. In Step S1302, the determination unit 94 sets a predetermined threshold value Th2 the second index value updated in Step S1301. In Step S1303, the determination unit 94 initializes the integrated amount of moisture discharged W [g/kg] to 0. The integrated amount of moisture discharged W is an integrated value of the amount of moisture discharged from the vehicle by ventilation, as described above.

In Step S1304, the weather information acquiring unit 92 acquires a current position of the vehicle from the travel history database 98.

In Step S1306, the weather information acquiring unit 92 acquires weather information at the current position of the vehicle from the weather database 99. Herein, it is assumed that the weather information includes information of outside air humidity at the current position of the vehicle.

In Step S1308, the determination unit 94, calculates an amount of moisture discharged ΔW per predetermined time Δt which is an amount of moisture discharged ΔW by ventilation on the basis of the weather information acquired in Step S1306 and the travel information in the travel history database 98. The method of calculating the amount of moisture discharged ΔW per predetermined time Δt is the same as described above in Step S806 with reference to FIG. 8. When the vehicle is not in operation, a ventilation air volume (for example, an experiment value) per predetermined time Δt by natural ventilation is used instead of the ventilation air volume per predetermined time Δt based on the blower air volume.

In Step S1310, the determination unit 94 adds the amount of moisture discharged ΔW calculated in Step S1308 to the current value of the integrated amount of moisture discharged W to update the integrated amount of moisture discharged W.

In Step S1312, the determination unit 94 determines whether the integrated amount of moisture discharged W is greater than the predetermined threshold value Th2 set in Step S1302. Step S1314 is performed when the determination result is "YES," and Step S1313 is performed otherwise. In Step S1313, the determination unit 94 subtracts the integrated amount of moisture discharged W updated in Step S1310 from the predetermined threshold value Th2 to update the second index value.

In Step S1314, the determination unit 94 resets the second index value to 0.

According to the process flow illustrated in FIG. 14, whenever the start switch of the vehicle is switched from OFF to ON, the server 90 determines whether the amount of moisture brought in is greater than the predetermined level. When it is determined that the amount of moisture brought in is greater than the predetermined level, the set signal can be transmitted from the server 90 to the vehicle, thereby enhancing the ventilation capacity of the air-conditioning device 10 of the vehicle. When it is determined that the amount of moisture brought in is greater than the predetermined level, the second index value (the index value indicating the amount of moisture remaining in the amount of moisture brought in at the time of the boarding event which can occur a plurality of times in the vehicle) is calculated (updated) by the server 90 and the second index value is set as the predetermined threshold value Th2. Thereafter, the server 90 updates the integrated amount of moisture discharged W which is an integrated value of the amount of moisture discharged by ventilation in real time and the server 90 transmits the reset signal to the vehicle when the integrated amount of moisture discharged W is greater than the predetermined threshold value Th2. In this way, according to the process flow illustrated in FIG. 14, it is possible to accurately estimate the timing at which brought-in moisture is completely discharged to the outside by the ventilation by updating the second index value for each boarding event of the vehicle in which the amount of moisture brought in is greater than the predetermined level and then updating the second index value on the basis of the amount of moisture discharged by ventilation of the air-conditioning device 10. Accordingly, it is possible to achieve optimization of the duration of the state in which the ventilation capacity of the air-conditioning device 10 has been enhanced by changing the duration of the state in which the ventilation capacity of the air-conditioning device 10 has been enhanced depending on the index value and the second index value.

While embodiments have been described above in detail, the disclosure is not limited to the specific embodiments, but can be modified and changed in various forms within the scope described in the appended claims. All or some of the elements of the above-mentioned embodiments may be combined.

For example, in the first embodiment (the same is true of the second embodiment), hail may be handled in the same way as snow or rain.

What is claimed is:

1. An air-conditioning control system comprising:
an air-conditioning device;
a control device including a memory configured to store control information of the air-conditioning device, the control information including a first state and a second state different from the first state, the control device being configured to:
acquire weather information at a position of a vehicle;
detect a boarding event in which an occupant boards the vehicle;
determine whether an amount of moisture brought in due to an external environment of the vehicle, the amount of moisture brought in is moisture brought into the vehicle by the occupant at the time of the boarding event due to the external environment of the vehicle, is greater than a predetermined level on the basis of the weather information when the boarding event is detected;
change the control information on the basis of a result of the determination; and
control the air-conditioning device according to control information,
wherein the control device changes the control information to the second state when it is determined that the amount of moisture brought in while the control information indicates the first state is greater than the predetermined level, and controls the air-conditioning device such that a ventilation capacity of the air-conditioning device is higher when the control information indicates the second state than when the control information indicates the first state.

2. The air-conditioning control system according to claim 1, wherein the control device determines that the amount of moisture brought in is greater than the predetermined level when weather at the time of the boarding event is rain or snow, the weather at the time of the boarding event is weather indicated by the weather information.

3. The air-conditioning control system according to claim 1, wherein the control device determines whether the amount of moisture brought in is greater than the predetermined level on the basis of attribute information at the time of the boarding event, the attribute information indicating an attribute of a parking lot, the attribute of the parking lot is an attribute of the position of the vehicle at the time of the boarding event.

4. The air-conditioning control system according to claim 1, wherein the control device updates an integrated value of a time in which weather at a current position of the vehicle is neither rain nor snow after the control information is changed to the second state, and returns the control information to the first state on the basis of the updated integrated value, the weather is weather indicated by the weather information.

5. The air-conditioning control system according to claim 1, wherein the control device updates an integrated value of an amount of moisture discharged from the vehicle by ventilation of the air-conditioning device on the basis of temperature information and humidity information outside the vehicle and temperature information inside the vehicle after the control information is changed to the second state, and returns the control information to the first state on the basis of the updated integrated value.

6. The air-conditioning control system according to claim 1, wherein the control device changes a duration in which the control information indicates the second state on the basis of a number of occupants.

7. An air-conditioning control system comprising:
an air-conditioning device provided on a vehicle;
a control device provided on the vehicle, the control device being configured to control the air-conditioning device;
a communication unit connected to the control device; and
an information processing device configured to perform bidirectional communication with the communication unit, the information processing device being disposed remotely from the vehicle, the information processing device including a memory configured to store control information of the air-conditioning device, the control information including a first state and a second state different from the first state, the information processing device being configured to:
acquire weather information at a position of the vehicle,
detect a boarding event in which an occupant boards the vehicle,
determine whether an amount of moisture brought in due to an external environment of the vehicle, the amount of moisture brought in is moisture brought into the vehicle by the occupant at the time of the boarding event due to the external environment of the vehicle, is greater than a predetermined level on the basis of the weather information when the boarding event is detected, and
change the control information on the basis of a result of the determination,
wherein
the information processing device changes the control information to the second state when the information processing device determines that the amount of moisture brought in while the control information indicates the first state is greater than the predetermined level, and
the information processing device transmits a first predetermined signal to the communication unit when the control information indicates the first state and transmits a second predetermined signal to the communication unit when the control information indicates the second state, and
the control device sets a ventilation capacity of the air-conditioning device to be higher when the communication unit receives the second predetermined signal than when the communication unit receives the first predetermined signal.

8. The air-conditioning control system according to claim 7, wherein the control device determines that the amount of moisture brought in is greater than the predetermined level when weather at the time of the boarding event is rain or snow, the weather at the time of the boarding event is weather indicated by the weather information.

9. The air-conditioning control system according to claim 7, wherein the control device determines whether the amount of moisture brought in is greater than the predetermined level on the basis of attribute information at the time of the boarding event, the attribute information indicating an attribute of a parking lot, the attribute of the parking lot is an attribute of the position of the vehicle at the time of the boarding event.

10. The air-conditioning control system according to claim 7, wherein the control device updates an integrated value of a time in which weather at a current position of the vehicle is neither rain nor snow after the control information is changed to the second state, and returns the control information to the first state on the basis of the updated integrated value, the weather is weather indicated by the weather information.

11. The air-conditioning control system according to claim 7, wherein the control device updates an integrated value of an amount of moisture discharged from the vehicle by ventilation of the air-conditioning device on the basis of temperature information and humidity information outside the vehicle and temperature information inside the vehicle after the control information is changed to the second state, and returns the control information to the first state on the basis of the updated integrated value.

12. The air-conditioning control system according to claim 7, wherein the control device changes a duration in which the control information indicates the second state on the basis of a number of occupants.

13. An information processing device disposed remotely from a vehicle comprising:
a memory configured to store control information of an air-conditioning device which is disposed in the vehicle, the control information including a first state and a second state different from the first state;
a control device configured to:
acquire weather information at a position of the vehicle;
detect a boarding event in which an occupant boards the vehicle;
determine whether an amount of moisture brought in due to an external environment of the vehicle, the amount of moisture brought in is moisture brought into the vehicle by the occupant at the time of the boarding event due to the external environment of the vehicle, is greater than a predetermined level on the basis of the weather information when the boarding event is detected by the boarding event detecting unit; and change the control information on the basis of a result of the determination; and a communication unit configured to perform bidirectional communication with the vehicle, wherein the control device changes the control information to the second state when is the control device determines that the amount of moisture brought in while the control information indicates the first state is greater than the predetermined level, and the communication unit transmits a first predetermined signal to the vehicle when the control information indicates the second state, the first predetermined signal serving as a command for causing a controller of the air-conditioning device to set a ventilation capacity of the air-conditioning device to be higher than when the control information indicates the first state.

14. The information processing device according to claim 13, wherein the communication unit transmits a second predetermined signal to the vehicle when the control information indicates the first state.

\* \* \* \* \*

UNITED STATES PATENT AND TRADEMARK OFFICE
CERTIFICATE OF CORRECTION

PATENT NO. : 10,703,167 B2
APPLICATION NO. : 15/625279
DATED : July 7, 2020
INVENTOR(S) : Maya Inui, Kunihiko Jinno and Kan Saitou Page 1 of 1

It is certified that error appears in the above-identified patent and that said Letters Patent is hereby corrected as shown below:

On the Title Page

Item (72), inventor 1, city, delete "Toyota" and insert --Toyota-shi Aichi-ken--, therefor.

Item (72), inventor 2, city, delete "Toyota" and insert --Toyota-shi Aichi-ken--, therefor.

Item (72), inventor 3, city, delete "Okazaki" and insert --Okazaki-shi Aichi-ken--, therefor.

In the Specification

In Column 12, Line(s) 63, after "position", delete "at at" and insert --at--, therefor.

In Column 15, Line(s) 18, after "position", delete "at at" and insert --at--, therefor.

Signed and Sealed this
Tenth Day of November, 2020

Andrei Iancu
*Director of the United States Patent and Trademark Office*